(12) United States Patent
Goldstein et al.

(10) Patent No.: US 8,272,140 B2
(45) Date of Patent: Sep. 25, 2012

(54) FLUID RESERVOIR ASSEMBLY

(75) Inventors: Fredric Goldstein, Nacka (SE); Robert Murray Barto, Jr., Palm Beach Gardens, FL (US)

(73) Assignee: Group One Limited, Ramsey, British Isles (IM)

( * ) Notice: Subject to any disclaimer, the term of this patent is extended or adjusted under 35 U.S.C. 154(b) by 0 days.

(21) Appl. No.: 13/164,197

(22) Filed: Jun. 20, 2011

(65) Prior Publication Data

US 2011/0247230 A1 Oct. 13, 2011

Related U.S. Application Data

(63) Continuation-in-part of application No. 12/949,171, filed on Nov. 18, 2010, now Pat. No. 7,979,999, which is a continuation of application No. 12/509,547, filed on Jul. 27, 2009, now Pat. No. 7,837,402, which is a continuation of application No. 12/053,815, filed on Mar. 24, 2008, now Pat. No. 7,578,071, which is a continuation-in-part of application No. 11/553,644, filed on Oct. 27, 2006, now Pat. No. 7,360,319.

(60) Provisional application No. 61/445,087, filed on Feb. 22, 2011.

(51) Int. Cl.
*G01F 23/04* (2006.01)
*A46B 17/06* (2006.01)
(52) U.S. Cl. .................................. 33/725; 401/122
(58) Field of Classification Search ............ 33/722–730; 15/220.4; 401/121, 122, 126, 128, 129, 130
See application file for complete search history.

(56) References Cited

U.S. PATENT DOCUMENTS

| | | | |
|---|---|---|---|
| 2,855,682 A | 10/1958 | Norgard | |
| 3,098,254 A | 7/1963 | Rose | |
| 3,549,266 A | 12/1970 | Vasas | |
| 3,686,702 A | 8/1972 | Jordan | |
| 3,703,038 A | 11/1972 | Smith | |
| 3,883,254 A * | 5/1975 | Vasas | 401/122 |
| 3,998,235 A | 12/1976 | Kingsford | |
| 4,241,743 A | 12/1980 | Schnabel et al. | |
| 4,433,928 A | 2/1984 | Kingsford | |
| 4,609,300 A | 9/1986 | Robert | |
| 4,891,859 A | 1/1990 | Tremblay | |
| 4,942,669 A | 7/1990 | Schnedl | |
| 4,975,998 A | 12/1990 | Anderson et al. | |
| 5,086,793 A | 2/1992 | Kingsford | |
| 5,099,584 A | 3/1992 | Williams | |
| 5,284,239 A | 2/1994 | Kiricoples | |
| 5,485,681 A | 1/1996 | Hitchcock | |
| 5,598,602 A | 2/1997 | Gibson | |
| 5,765,255 A | 6/1998 | Bychkowsky | |
| 5,803,639 A | 9/1998 | Gusakov et al. | |

(Continued)

FOREIGN PATENT DOCUMENTS

JP 346519 2/1991

*Primary Examiner* — G. Bradley Bennett
(74) *Attorney, Agent, or Firm* — Carlson, Gaskey & Olds PC

(57) ABSTRACT

A bottle assembly has a bottle for storing a fluid, such as a cosmetic fluid. An applicator for applying the fluid is configured to be insertable and removable from the bottle along a path. A sealing body, or assembly, which may include one or more seals, is configured to continue to seal the bottle when the cap is removed.

30 Claims, 21 Drawing Sheets

U.S. PATENT DOCUMENTS

| | | |
|---|---|---|
| 6,018,882 A | 2/2000 | Brousseau |
| 6,149,334 A | 11/2000 | Nicoll |
| 6,264,390 B1 | 7/2001 | Lee et al. |
| 6,289,601 B1 | 9/2001 | Bricker |
| 6,345,626 B1 | 2/2002 | Bouix |
| 6,502,584 B1 | 1/2003 | Fordham |
| 6,676,320 B1 | 1/2004 | Wainer |
| 7,360,319 B1 | 4/2008 | Goldstein et al. |
| 7,455,468 B2 | 11/2008 | Gueret |
| 7,537,406 B2 | 5/2009 | Kurek et al. |
| 7,578,071 B2 | 8/2009 | Goldstein et al. |
| 7,686,528 B2 * | 3/2010 | Gueret .......................... 401/129 |
| 7,837,402 B2 | 11/2010 | Goldstein et al. |
| 2005/0214058 A1 | 9/2005 | Rousselet |
| 2005/0249538 A1 | 11/2005 | Patel |
| 2005/0271454 A1 | 12/2005 | Gueret |
| 2008/0273914 A1 | 11/2008 | Hamada |
| 2009/0065019 A1 | 3/2009 | Salciarini |
| 2009/0274507 A1 | 11/2009 | Matsuoka |
| 2009/0285618 A1 * | 11/2009 | Goldstein et al. ............. 401/122 |
| 2010/0104348 A1 | 4/2010 | Rauschert et al. |
| 2010/0266327 A1 | 10/2010 | Lin et al. |
| 2012/0099918 A1 * | 4/2012 | Dambricourt ................. 401/122 |

* cited by examiner

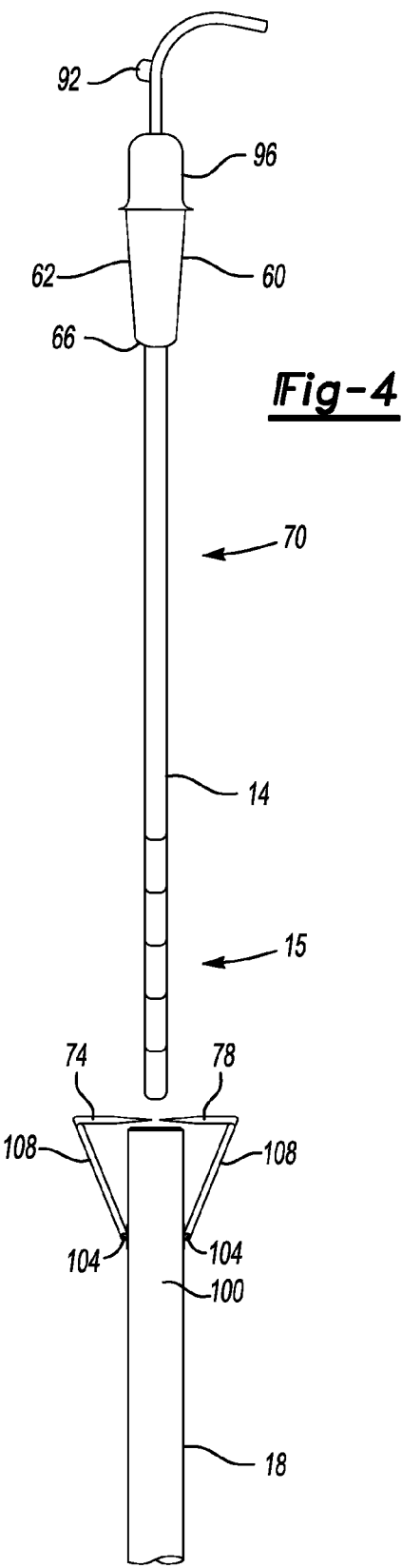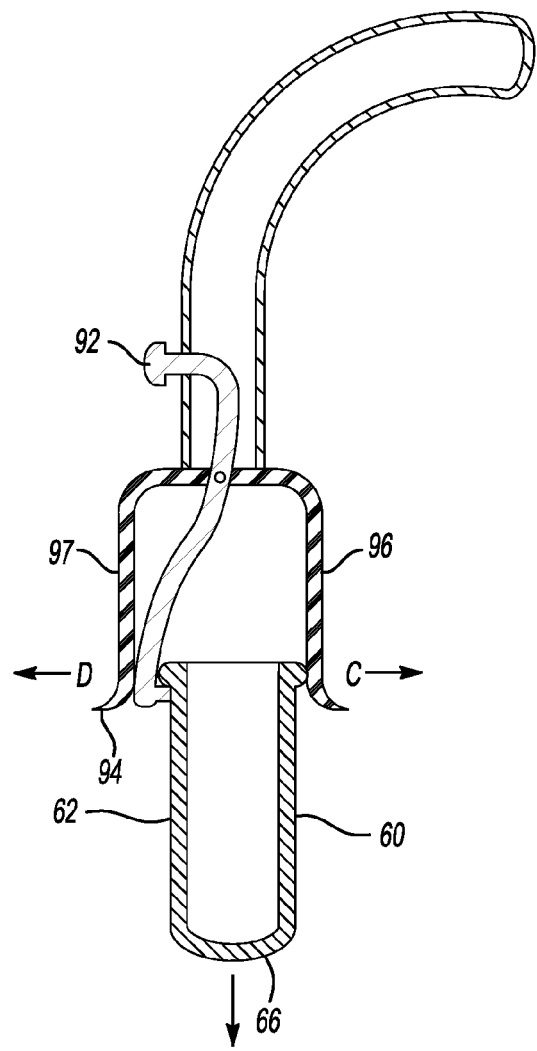

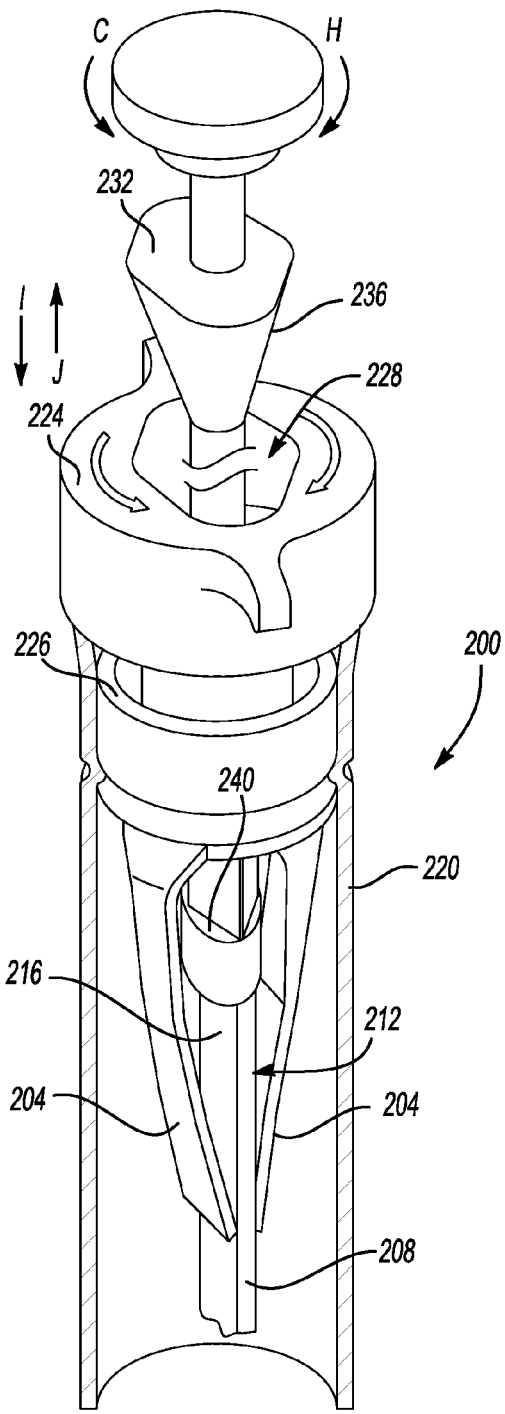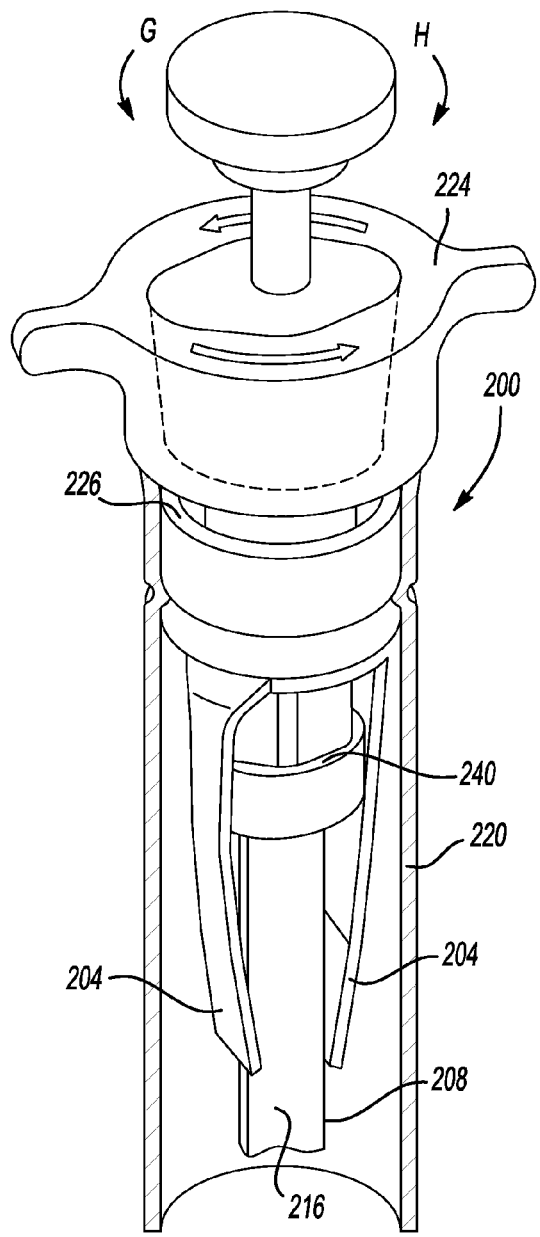
Fig-6
Fig-7

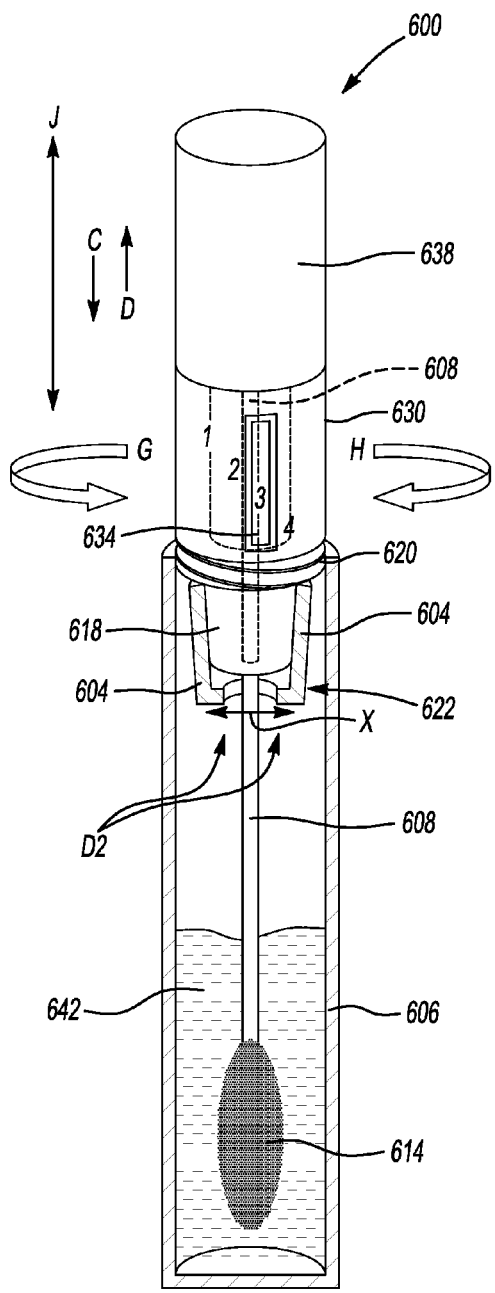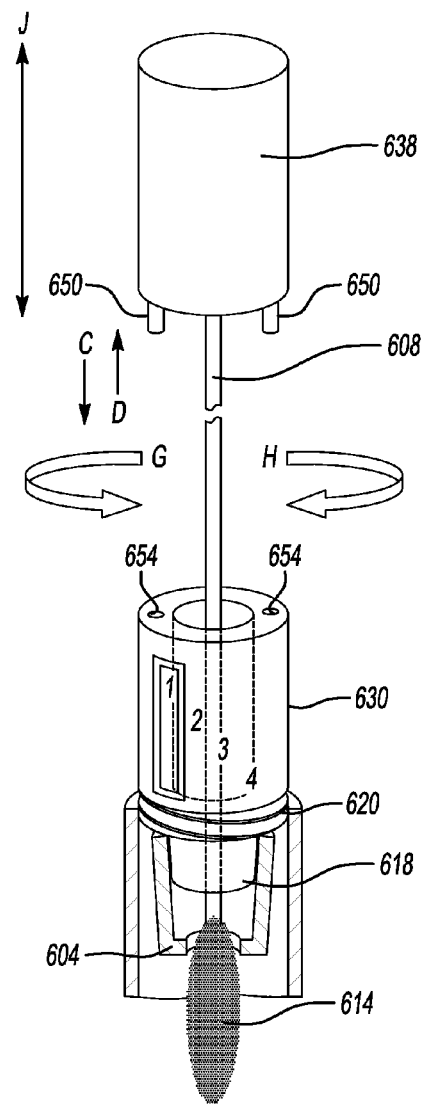
Fig-22
Fig-23

FLUID RESERVOIR ASSEMBLY

CROSS REFERENCE TO RELATED APPLICATIONS

This application claims priority to U.S. Provisional Application No. 61/445,087 filed Feb. 22, 2011, and is also a continuation-in-part of U.S. Non-Provisional application Ser. No. 12/949,171 filed Nov. 18, 2010, now U.S Pat. No. 7,979,999 which is a continuation of U.S. Non-Provisional application Ser. No. 12/509,547 filed Jul. 27, 2009 (now U.S. Pat. No. 7,837,402), which is a continuation of U.S. Non-Provisional application Ser. No. 12/053,815 filed on Mar. 24, 2008 (now U.S. Pat. No. 7,578,071), which is a continuation-in-part to U.S. Non-Provisional application Ser. No. 11/553,644 filed on Oct. 27, 2006 (now U.S. Pat. No. 7,360,319).

BACKGROUND OF THE INVENTION

This invention relates to a fluid reservoir having a wiper (or, "membrane" or "seal").

A commercial fluid container has a fluid reservoir for storing a fluid. There may be an inserter provided with the fluid container to check its fluid level in the case of an oil reservoir for a vehicle or to distribute fluid from the container in the case of a mascara bottle. For these commercial products, the inserter is left in the reservoir for convenience. Due to the viscosity of fluid, fluid will tend to collect on the inserter and may interfere with the accurate measurement of fluid or the controlled distribution of fluid. It may be desirable to withdraw the inserter and wipe it clean of fluid prior to measuring or applying the fluid. This may be inconvenient, messy as well as wasteful.

For example, a dip stick, is used to measure oil in an oil pan or, more broadly, an oil reservoir of a vehicle. Typically, the dip stick remains inserted in a housing that is connected to the oil reservoir. The dip stick will typically have some markings, which serve to reflect the level of oil in the reservoir. During normal operation of the vehicle, oil will splash onto the dip stick at points that do not accurately reflect the oil level. When the oil level is checked, the dip stick is removed from the housing and is typically wiped clean with a cloth. The dip stick is then reinserted into the housing and then removed again to read the oil level, which then provides an accurate reflection of the oil level in the reservoir.

This technique for checking the oil level in a vehicle has its drawbacks. Specifically, the technique is messy. One must have ready some way to wipe the dip stick clean, which is typically a cloth, paper towel or rag. Also, the cloth or such used to wipe the dip stick must be thrown away because it is difficult or impractical to clean, both wasting the cloth and causing the inconvenience of its disposal. Oil is also wasted because oil on the dip stick is left on the cloth rather than returned to the oil reservoir.

There have been efforts to simplify this process. Electronic systems exist that measure the level of oil in the vehicle. However, these systems are often unreliable or expensive. In addition, they normally only indicate if the level is low, not how low or how much oil is required to reach the proper level. Manual systems also exist that include wiping mechanisms on the housing. Although preferable to wiping the dip stick with a rag, these assemblies may be complicated, awkward to use or expensive.

Another example of a commercial fluid container relates to the application and measure of a liquid, such as mascara and the like, housed in a bottle, including a brush or other applicator means, whereby the user may decide a predetermined amount of liquid on the applicator.

As relates to the cosmetic industry, mascara is a standard manner in which eyes are decorated and enhanced by its application on eyelashes. Common in most all mascara products is a elongated enclosed bottle which includes a cap. Attached to the cap is typically a brush which descends the depth of the housing. Within the housing is an amount of mascara liquid.

Because of the viscous nature of the mascara liquid, the brush would exit the bottle fully (and unevenly) loaded with mascara, making it impractical for application to fine eyelashes. To address this problem, most cosmetic companies insert a rubber type plug into the opening of the housing. This plug itself has an opening, typically around 4 mm, which corresponds to the width of the brush. Ideally, upon removal of the brush from the housing, by passing through the opening in the plug the brush will have a pre-determined contact with the opening with the goal that the same amount of mascara will exit with the brush with each removal.

The problem with this system is that a compromise amount of mascara must be determined upon design and production. The opening is non-adjustable and therefore the user cannot increase or decrease the amount of mascara on the brush. The cosmetic company determines a single measure as the middle ground amount and the opening corresponds to that amount.

If the user should desire a larger amount of mascara, it would not be possible to obtain a fully loaded brush with the one-size-fits-all opening. Nor, if so desired, can the user obtain a lesser amount of mascara on the brush without using a tissue to manually wipe off the brush.

Another problem is that mascara typically coagulates over time and after repeated use, as with air entering the housing, the liquid loses water content, becoming more viscous. The opening which may have suited new free flowing mascara may no longer suit older thicker mascara and undesired clumps of mascara may remain on the applicator.

To remove this unwanted mascara, a user may wipe the applicator with a tissue before its application. However, as a consequence of this design, the user must carry a tissue or other wipe for the applicator, wipe the applicator, and then later dispose of the wipe after its use. These steps are inconvenient for the user. Moreover, excess mascara is simply wasted. Given the relatively high cost of mascara, it would be preferable to keep this excess mascara in the bottle until needed.

Additionally, this older thicker mascara, reduced in volume, may more readily stick to the sides of the housing, making it impossible for the brush to angle to reach it due to the restrictive nature of the plug opening. The undesired result is an unsatisfactory percentage of mascara remaining beyond the reach of the brush and so requiring the user to dispose of the product before it is actually fully used.

Similar problems exist with other cosmetic fluids, such as lip gloss and nail polish, both of which also employ an applicator which obtains the cosmetic fluid from a bottle.

A need therefore exists for a fluid reservoir assembly that allows for the adjustment of the amount of cosmetic fluid a which remains on the applicator upon exiting the bottle.

Further, certain types of fluid reservoir assemblies, particularly cosmetics bottles, house mascara and other like fluids, and include an applicator, or brush. These bottles may include a seal, or wiper, and may allow a user to adjust the seal to control the amount of fluid carried out of the bottle by the brush. Other types of bottles, particularly those used in the medical and food industry, include seals primarily to act as a convenient non-drip dispenser of a product.

SUMMARY OF THE INVENTION

One aspect of the invention comprises a dip stick assembly and related technique. The dip stick has a measure for reading the oil level of an oil reservoir of a vehicle. The dip stick is received in a housing, which allows the dip stick to be inserted into the oil reservoir. To facilitate cleaning, the dip stick has wipers attached to the housing. The wipers have an engaged position and a disengaged position. In the engaged position, the wiper is in contact with the dip stick. In the disengaged position, the wiper is out of contact with the dip stick.

The wipers may be resiliently biased into the engaged position so that the dip stick is automatically wiped when removed from the housing. A block is provided to prevent the wiper from moving into the engaged position. The block is moveable between a blocking position and an unblocking position. In the blocking position, the block maintains the wiper in the disengaged position, while, in the unblocking position, the block permits the wiper to move to the engaged position. The inventive dip stick assembly provides an automatic technique for cleaning the dip stick assembly. The dip stick is placed in communication with an oil reservoir. The wipers are biased into engagement with the dip stick. The wiper, however, is prevented from engaging the dip stick by the block. The block is then removed to allow the wiper to contact the dip stick and wipe it. The dip stick is then reinserted. The block is returned to the blocking position and left there. When the dip stick is removed, the wipers remain in the disengaged position, thereby allowing the dip stick to be removed without wiping, thereby providing a simple and inexpensive assembly and technique for cleaning and reading the dip stick.

Another aspect of the invention involves a cosmetic bottle for storing a liquid cosmetic. An applicator for applying the cosmetic fluid is provided and is insertable and removable from the bottle along a path. A wiper for wiping the cosmetic fluid from the applicator is disposed within the bottle. The wiper has a first wiping position and a second wiping position. The wiper is closer to the applicator in the first wiping position than in the second wiping position when the applicator is moved along the path. A block is configured to be disposed between the wiper and the applicator. The block is configured to selectively allow the wiper to move between the first wiping position and the second wiping position.

Another disclosed fluid reservoir assembly may be a cosmetic bottle assembly that may include an applicator having a brush, for example. In order to remove fluid from the reservoir, the brush passes through a seal. In a neutral, or relaxed, position, the seal encloses the reservoir to prevent entry of outside air. The amount of fluid wiped from the brush by the seal may be selectively controllable. Further, the disclosed fluid reservoir assembly may include two spaced apart seals defining an antechamber therebetween.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 4 illustrates an alternative version of the inventive dip stick assembly.

FIG. 5 illustrates a block and release of the version of FIG. 4.

FIG. 6 illustrates another version of the inventive dip stick assembly with dip stick in unblocking position.

FIG. 7 illustrates the version of the inventive dip stick assembly of FIG. 6 with dip stick in blocking position.

FIG. 22 shows the version of the cosmetic bottle assembly of FIG. 21 with wipers in second wiping position.

FIG. 23 shows another view of the cosmetic bottle assembly, including applicator handle.

DETAILED DESCRIPTION OF THE PREFERRED EMBODIMENTS

Figure 1:
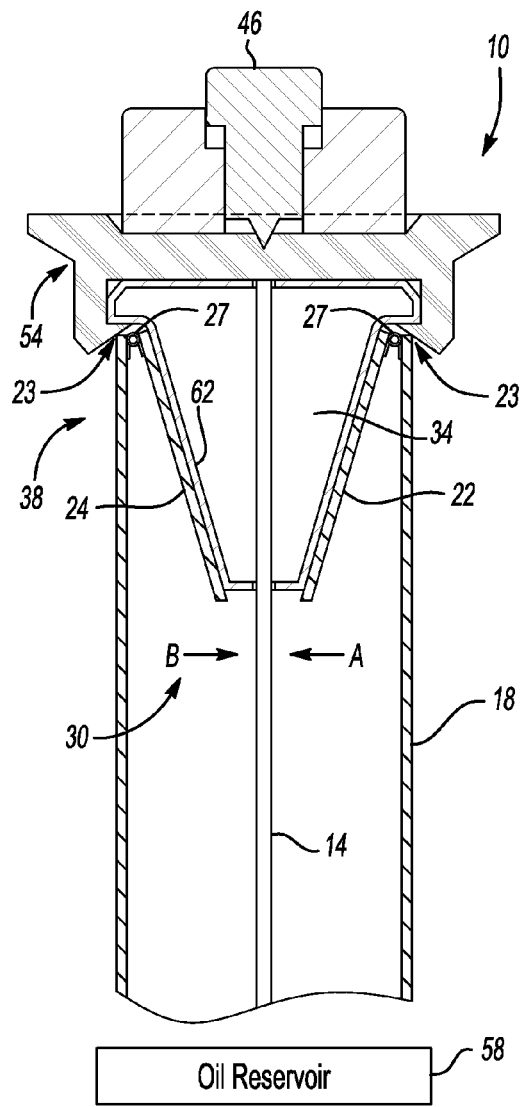
FIG. 1 illustrates a version of the inventive dip stick assembly, including dip stick, housing, wipers and block.

FIG. 1 illustrates inventive dip stick assembly 10. Dip stick assembly 10 has an inserter, here dip stick 14, disposed in housing 18 as shown. Housing 18 is connected to oil reservoir 58 in a vehicle. Dip stick 14 has markings 15 that permit the fluid level of oil reservoir to be read by dip stick 14 as known.

Figure 2:
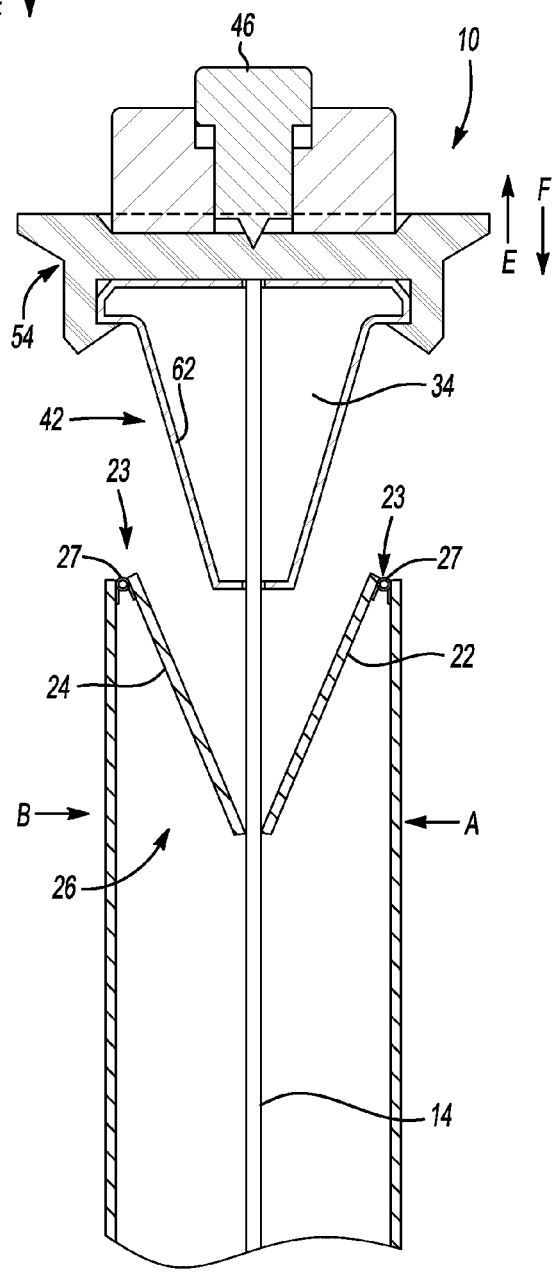
FIG. 2 illustrates the dip stick assembly of FIG. 1 in which the wipers are in the engaged position to wipe the dip stick.

In contrast to existing assemblies, dip stick assembly 10 has wipers, such as wipers 22 and 24, which pivot between engaged position 26 as shown in FIG. 2 and disengaged position 30 as shown in FIG. 1. Wipers 22, 24 are connected to housing 18 and are resiliently biased by springs 27 to engaged position 26, which is in contact with dip stick 14 as shown in FIG. 2. Wiper 22 is connected to housing 18 at pivot 23 while wiper 24 is connected to housing 18 at pivot 25. Within pivot 23 and pivot 25 are springs 27 that urge wiper 22 in the direction of arrow A and urge wiper 24 in direction of arrow B when wiper 22 and 24 are in the disengaged position 30 as shown in FIG. 1.

Maintaining wiper 22 and 24 from engaged position 26 is block 34. Block 34 comprises a frustroconical hollow insert that is sized to be received within housing 18. Block 34 has inclined surface 62 that engages wipers 22 and 24 and facilitates insertion of block 34 between wipers 22, 24. When block 34 is withdrawn in the direction of arrow E, as shown in FIG. 2, to unblocking position 42, wipers 22 and 24 move in the direction of arrow A and the direction of arrow B, respectively, because of their spring bias toward engaged position 26. In engaged position 26, as shown in FIG. 2, wiper 22 and 24 contact dip stick 18 so that when dip stick 14 is withdrawn, wipers 22 and 24 wipe excess oil off dip stick 14. In this way, wiper 22 and 24 automatically engage dip stick 14 so that dip stick 14 may be wiped simply by withdrawing block 34 and dip stick 14 in the direction of arrow E. It will be appreciated that the blocking structure may comprise any form which prevents the engagement of the wipers with the dip stick, in which the block may also be, by way of example, a flat projection. Furthermore, the housing for the wiper and blocking structure need not be circular, as is normal for the pipe leading into the oil reservoir, but may also be rectangular or square. Similarly, the wipers need not have the shape of standard wipers but may additionally be a resilient slot or an orifice which will retain or revert back to its original shape or position after a blocking structure is inserted in order to perform the repeated function of wiping the dip stick in a subsequent oil check. A wiper then is any structure which performs the function of wiping.

As shown in FIG. 2, wiper 22 and 24 are located within housing 18. This permits oil wiped from dip stick 14 to be returned to oil reservoir 58 because wiped oil remains in housing 18. After dip stick 14 is withdrawn in the direction of arrow E, it may then be reinserted into housing 18 by moving it in the direction of arrow F. Now, dip stick 14 is exposed to oil reservoir 58 after having been wiped by wiper 22 and 24.

Figure 3:
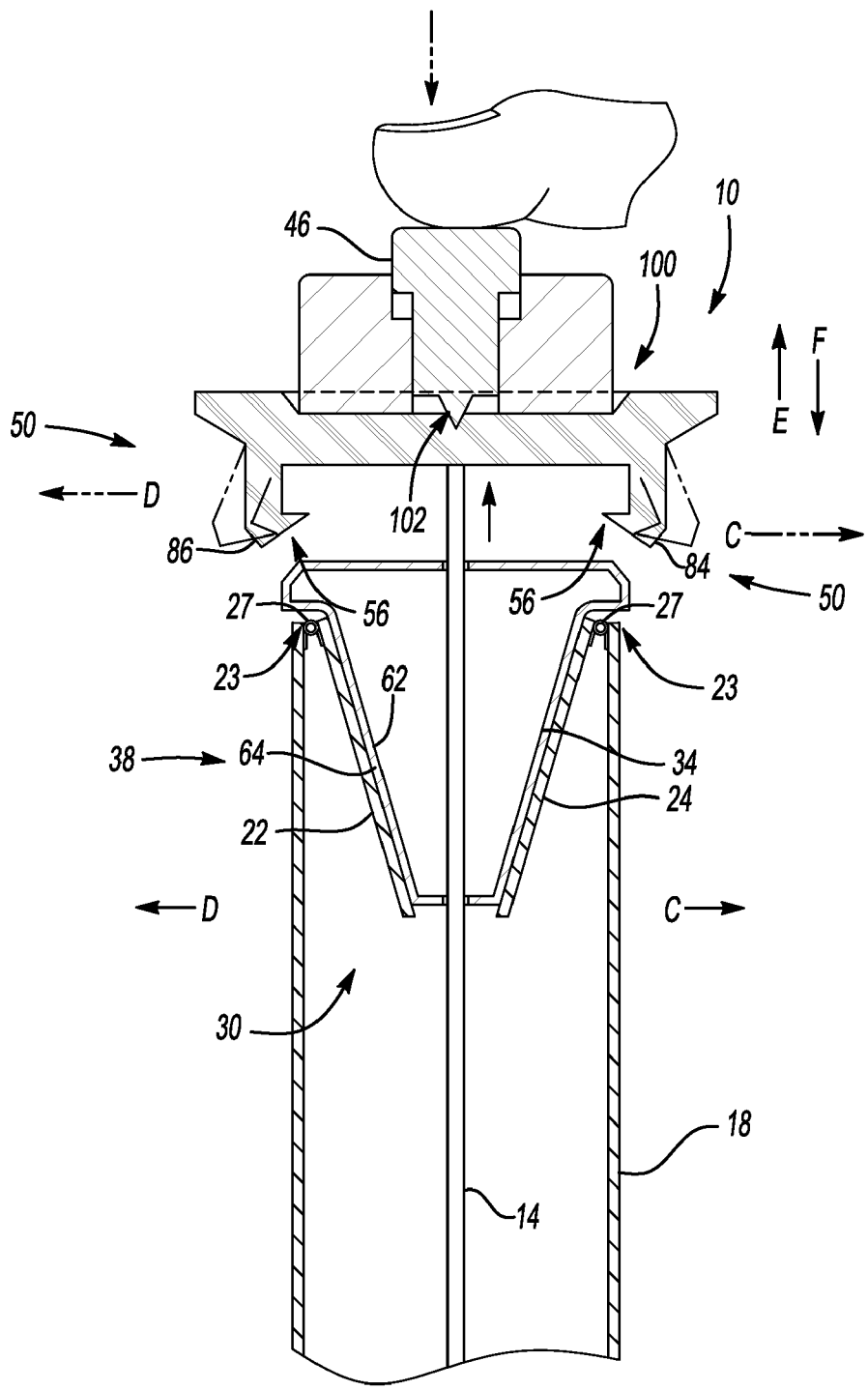
FIG. 3 illustrates the block of FIGS. 1 and 2 in a blocking position to prevent the wipers from wiping the dip stick.

Block 34 is releasably coupled to dip stick 14 by catches 84, 86, which are formed as part of cap 100. Cap 100 is connected to dip stick 14. Block 34 is shown in unreleased position 54 in FIGS. 1 and 2. Cap 100 and catches 84, 86 are made of a resilient material, such as plastic. Release 46 is slideably received in cap 100 and may move in the direction of arrow F to apply pressure to break 102, which is a channel in the plastic to permit flexing of catches 84, 86 in the direction of arrows C and D, respectively. To prevent dip stick 14 from being wiped again, as shown in FIG. 3, release 46 is actuated by depressing it in the direction of arrow F. This action causes catches 84, 86 to bend resiliently in the direction of arrow C for catch 84 and in the direction of arrow D for catch 86. Catches 84 and 86 accordingly pivot away from block 38 to release block 34 to released position 50 wherein block 34 is no longer coupled to catches 84 and 88 and consequently dip stick 14. Hence, when dip stick 14 is moved in the direction of arrow E and lifted from housing 18, as shown in FIG. 3, block 34 is left in blocking position 38 to prevent wiper 22 and 24 from contacting dip stick 14, maintaining wipers 22, 24 in disengaged position 30. Hence, when dip stick 14 is withdrawn, wipers 22 and 24 will not wipe dip stick 14. Dip stick 14 may then be withdrawn with oil unwiped from dip stick, thereby allowing dip stick 14 to be read for an accurate measurement of oil in oil reservoir 58. As shown, block 34 has a hollow 64 that permits dip stick 14 to slide freely within block 34 when block 34 is released from cap 100.

FIG. 4 illustrates an alternative version of the inventive dip stick assembly. Here, dip stick assembly 70 has block 60. Block 60 has inclined surface 62 as well as curved portion 66. Like block 34, block 60 is hollow and slideably receives dip stick 14. Cap 96 is secured to dip stick 14. Furthermore, assembly 70 has release 92 that when actuated, moves catch 94 by lever 97 in the direction of arrow D to release block 34 from engagement with cap 96. Ball bearings are provided on cap 96 to permit block 60 to be slideably received within cap 96.

In addition, as shown in FIG. 4, wipers 74 and 78 are attached externally to housing 18, thereby permitting wipers 74 and 78 to be added to a vehicle in the aftermarket. They are mounted by fastener 100, which has springs that are attached to housing 18 and arms 108. As in the previous version, wiper 74 and 78 are resiliently biased to engage dip stick 14 when dip stick is inserted. Dip stick 14 is operated in the same way as dip stick assembly 10.

FIGS. 6 and 7 illustrate another version of the inventive dip stick assembly. Dip stick assembly 200 has dip stick 208 disposed in housing 220, which is connected to an oil reservoir as known. Dip stick 208 is long enough to extend into the oil reservoir to accurately gauge the oil level. Disposed in housing 220 is wiper support 226, which is locked in place to prevent movement in the direction of arrows I or J or rotation in the direction of arrows G or H. Wiper support 226 has wipers 204. Like the other versions of the invention, dip stick assembly 200 has wipers 204 resiliently biased into engagement with dip stick.

In FIG. 6, dip stick 208 is wiped by lifting dip stick 208 in the direction of arrow J. This action causes dip stick 208 to be wiped by wipers 204, which are resiliently biased into engagement with face 212 and face 216 of dip stick 208. Face 212 and face 216 has markings, such as a standard gauge for measuring oil level. Hence, faces 212 and 216 of dip stick 208 are cleaned before reinsertion into oil reservoir. Dip stick 208 is returned to a position where it is in contact with the oil level by lowering dip stick 208 in the direction of arrow I. Dip stick 208 is guided by guide 224 that has hole 228 shaped to receive mating component 232 so that when mating component 232 is returned to hole 228, face 212 and face 216 are in contact with wipers 204. This feature ensures the correct orientation of dip stick 208 and its faces 212, 216 relative to wipers 204 so that wipers 204 may contact face 212 and face 216 to clean the surfaces of oil.

Also, the cleaning of dip stick 208 may be done without removal of dip stick 208 from housing 220, thereby ensuring wiped oil remains within housing 220. Dip stick 208 is provided with upper stop 236 and lower stop 240. Upper stop 236 prevents dip stock 208 from traveling in the direction of arrow I beyond the point where dip stick 208 is calibrated with markings so that dip stick 208 will accurately measure the oil level. Guide 224 holds upper stop 236 at this point by preventing stop 236 from passing through hole 228 because of hole 228's tapering shape. Lower stop 240 prevents dip stick 208 from being removed from housing 220 by its interference with wiper support 226.

Figure 7A:
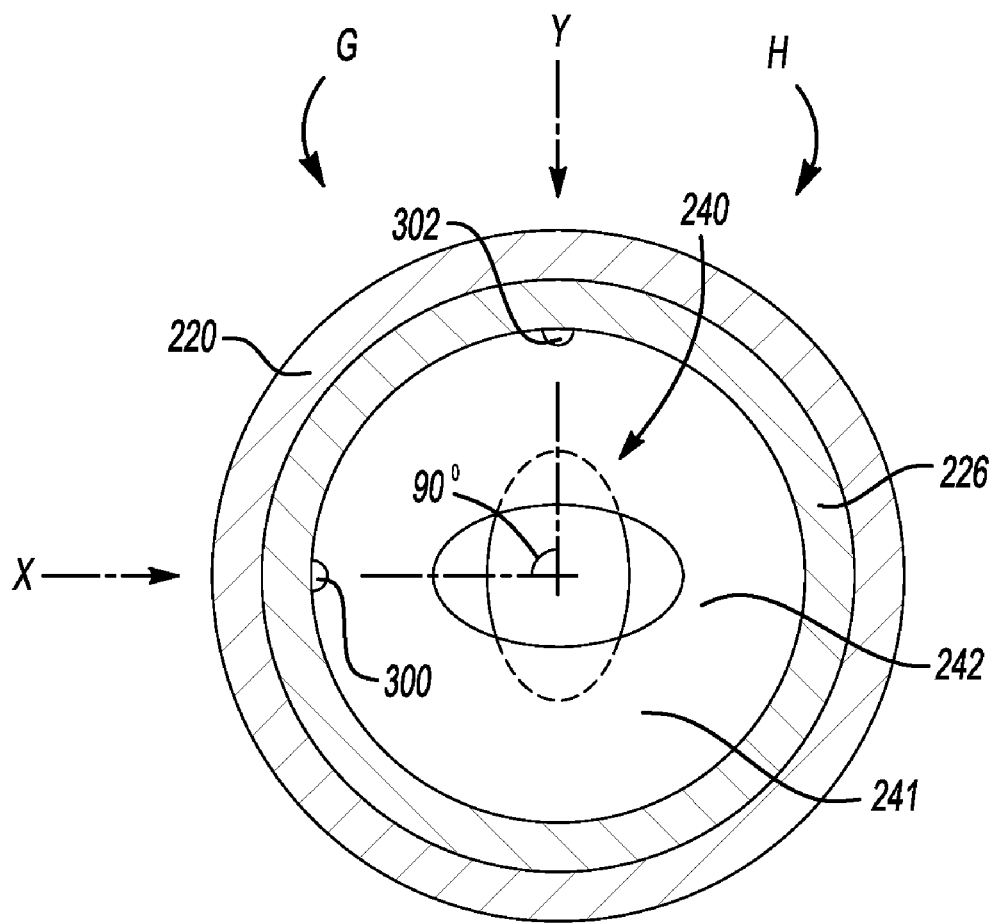
FIG. 7A illustrates a plan view of the wiper support for the wipers of the dip stick assembly of FIGS. 5-7.

FIG. 7A illustrates a plan view of housing 220 and wiper support 226 in the direction of arrow I, as shown in the position of FIG. 6. As can be seen, wiper support 226 has a base 241 with hole 242 which is shaped and sized like wiper support 240 but, in this position, rotated about ninety degrees) (90° from the mating shape of wiper support 240. In this position of FIGS. 6 and 7A, wiper support 240 is blocked from moving past base 241. Hence, upper stop 232 is prevented from traveling beyond guide 224 while lower stop 240 is prevented from traveling past base 241 of wiper support 240. In this way, dip stick 208 can be pumped down in the direction of arrow I and pulled up in the direction of arrow J to clean dip stick 208 without removing it completely from its housing. It will be understood by one of ordinary skill in the art that wipers 204 must contact dip stick 208 at a point low enough so that when lower stop 240 is at the point of base 241, wipers 204 will have wiped all of the level markings.

Figure 8:
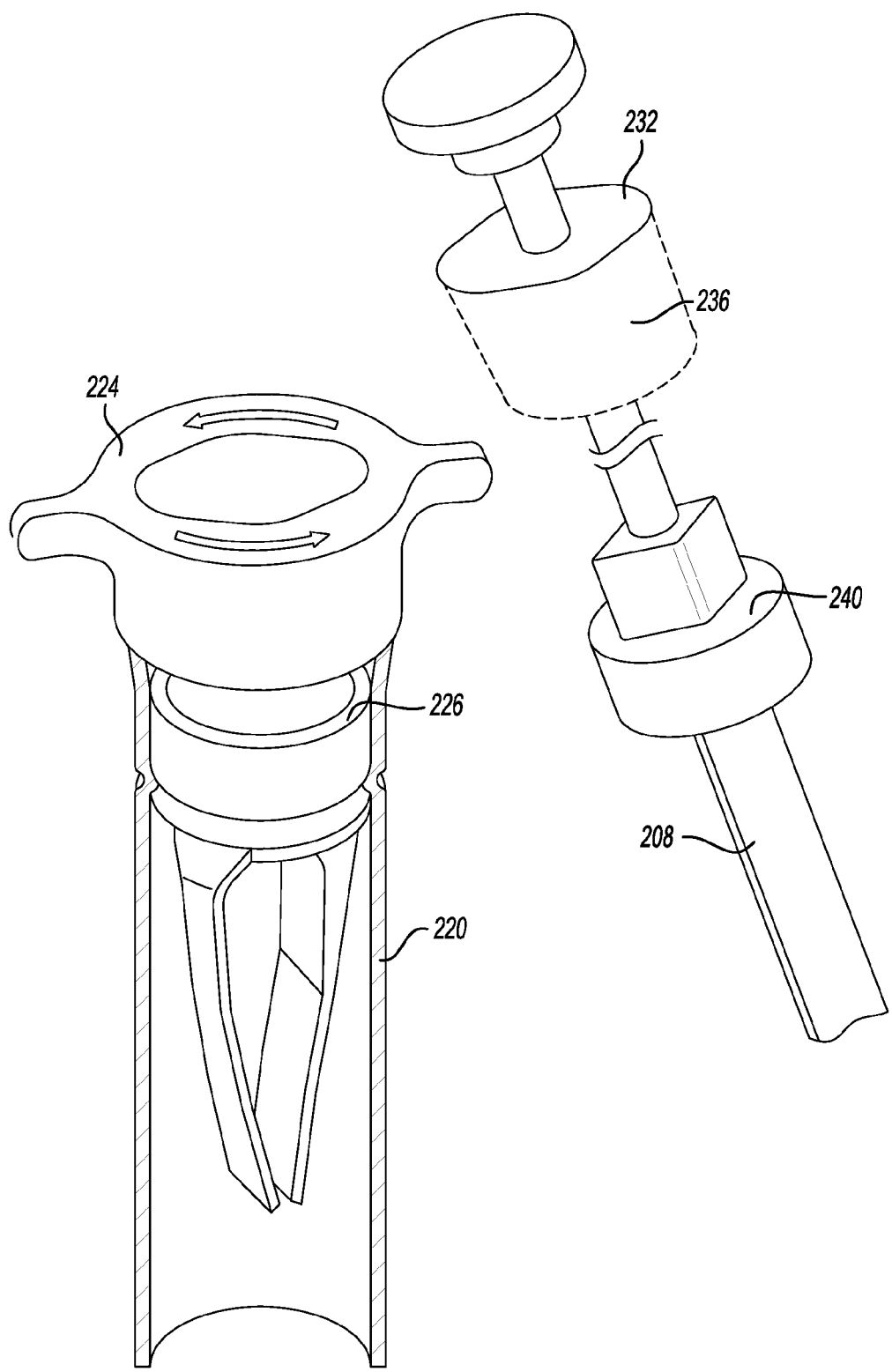
FIG. 8 illustrates the version of the inventive dip stick assembly of FIGS. 6 and 7 with dip stick removed from its housing.

Guide 224 is rotatably mounted to housing 220 to allow its movement in the direction of arrows G or H but to prevent its movement in the directions of arrows I or J. As shown in FIG. 7A, stops 300 and 302 are provided on wiper support 226 or, alternatively, on housing 220, so that guide 224 may rotate 90 degrees between position X and position Y. Stops 300 and 302 may be detents. As shown in FIG. 7, to read dip stick 208 following wiping, guide 224 is rotated from position shown in FIG. 6 in the direction of arrow G, say 90°. Rotation to position X causes dip stick 208 to block wipers 204 from engaging face 212 and face 216 of dip stick 208. Also, as shown in FIG. 7A, lower support 240 will likewise be rotated to position X by rotation of guide 224 to this position so that lower stop 240 may now pass hole 242. Lower stop 240 should be sized to pass freely through hole 228 too. Accordingly, as shown in FIG. 8, when dip stick 208 is withdrawn with guide 224 in the direction of arrow D, dip stick 208 may then be read without having oil wiped off by wipers 204.

Figure 9A:
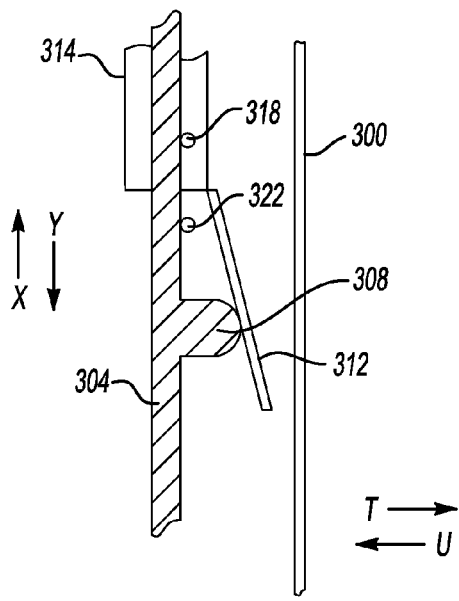
FIG. 9A illustrates another version of a dip stick assembly according to the invention with wipers disengaged.

FIG. 9A illustrates another version of the invention. As shown, dip stick 300 is disposed in housing 304, which is only partially shown. Here, the invention is shown schematically but one of ordinary skill in the art would understand that housing 304 may surround dip stick 300 as known. Housing 304 has block 308, which is here a protrusion extending from its surface toward dip stick 300. Wiper 312 is shown out of contact with dip stick 300 and resting on block 308. Wiper 312 may be resiliently biased away from contact with dip stick 300. Further, wiper 312 is pivotally mounted on carrier 314, which is slideably received on housing 304 and is configured to move up in the direction of arrow X or down in the direction of arrow Y. Wiper 312 may pivot in the direction of arrow T to move toward dip stick 300 or in the direction of arrow U away from dip stick 300.

Figure 9B:
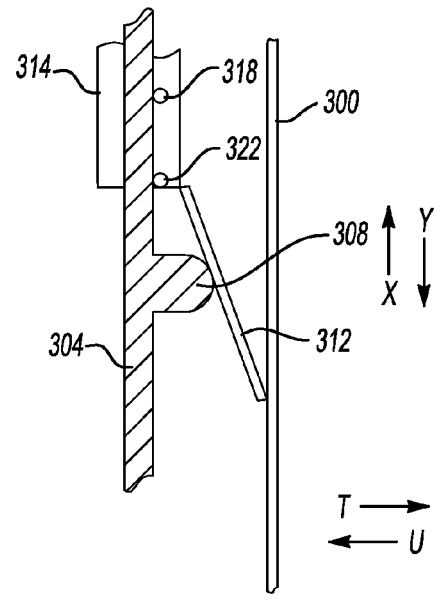
FIG. 9B illustrates the version of the dip stick assembly of FIG. 9A with the wipers engaged.

To place wiper 312 in contact with dip stick 300, as shown in FIG. 9B, carrier 314 slides down housing 304 in the direction of arrow Y, which causes wiper 312 to pivot in the direction of arrow T on block 308. As dip stick 300 is withdrawn from housing 304 in the direction of arrow X, wiper 312 then cleans dip stick 300 of excess oil. Dip stick 300 is then returned to housing 304 in the direction of arrow Y. Carrier 314 is then moved in the direction of arrow X, causing wiper 312 to pivot away from dip stick 300 in the direction of arrow U so that dip stick 300 may then be withdrawn to take an accurate measurement of the oil level on dip stick 300 without being wiped by wiper 312. Detents 318 and 322, such as an indentation and receiving protrusion, may be provided to lock carrier 314 momentarily in position where wiper 312 is in contact with dip stick 300 and in position where wiper 312 is out of contact with dip stick 300.

Figure 10A:
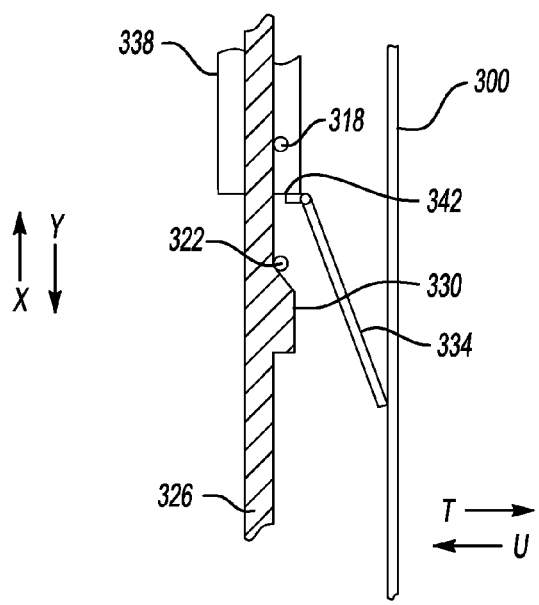
FIG. 10A shows another version of the invention with wipers engaged.
Figure 10B:
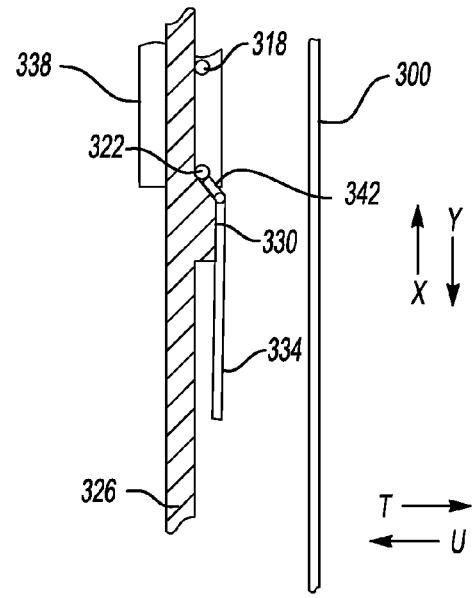
FIG. 10B shows the version of the invention of FIG. 10A with wipers disengaged.

Turning now to FIGS. 10A and 10B, another version of the invention is shown. FIG. 10A shows housing 326 having block 330 extending toward dip stick 300. Wiper 334 is provided and pivotally mounted to carrier 338, which is slideably mounted to housing 326. Wiper 334 may be resiliently biased into contact with dip stick 300 as shown. Carrier 338 may be held momentarily in place by detent 318 here. Wiper 334 is also provided with catch 342. With wiper 334 in contact with dip stick 300, dip stick 300 may be withdrawn in the direction of arrow X to clean it of excess oil. Dip stick 300 may then be returned in the direction of arrow Y so that it may measure the oil level of the reservoir.

To prevent wiper 334 from wiping dip stick 300, carrier 338 is then moved in the direction of arrow Y along housing 326, overcoming the resistance to movement provided by detent 318 to a position on housing 326 shown in FIG. 10B, wherein detent 322 is engaged to momentarily hold carrier 338 in place. In this position, as shown, catch 342 of wiper 334 moves into contact with block 330, causing wiper 334 to swing away from dip stick 300 in the direction of arrow U. Wiper 334 may then be withdrawn from housing 326 again so that the fill level of oil may be correctly checked. After checking, carrier 338 may be moved back up in the direction of arrow X. Block 330 no longer holds wiper 334 out of contact with dip stick 330. Due to its resilient bias, wiper 334 returns in the direction of arrow T to its position in contact with dip stick 300 as shown in FIG. 10A.

In addition, while dip sticks have been shown as flat, dip sticks may be round with contoured wipers to engage the round cylindrical shape of the dip stick. In this way, dip stick need not be oriented relative to the wipers as the entire contoured surface of the dip stick would be wiped by the contour wipers.

Figures 11, 12:
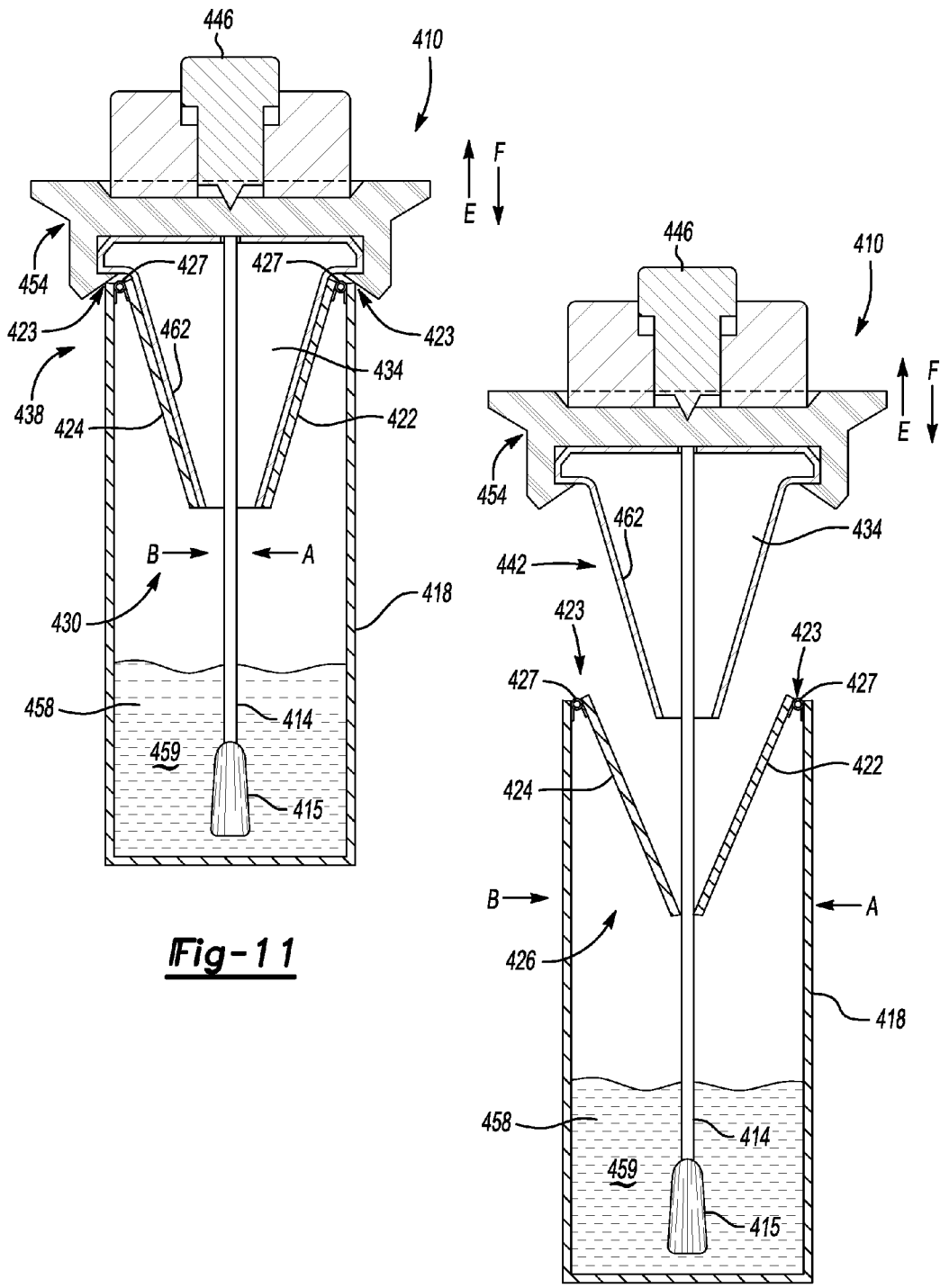
FIG. 11 illustrates a version of the inventive cosmetic bottle assembly, including applicator, bottle, wipers and block.
FIG. 12 illustrates the cosmetic bottle assembly of FIG. 11 in which the wipers are in a first wiping position.

Another aspect of the invention involves a cosmetic container, such as a bottle for mascara. FIG. 11 illustrates inventive cosmetic bottle assembly 410. cosmetic bottle assembly 410 has an inserter, here applicator 414 having brush 415, disposed in bottle 418 as shown. Bottle 418 is a fluid reservoir 458 for a cosmetic fluid, here mascara 459.

Cosmetic bottle assembly 410 has wipers, such as wipers 422 and 424, which pivot between first wiping position 426 as shown in FIG. 12 and second wiping position 430 as shown in FIG. 11. Wipers 422, 424 are connected to bottle 418 and are resiliently biased by springs 427 toward first wiping position 426, which is in contact with applicator 414 as shown in FIG. 12. Wiper 422 is connected to bottle 418 at pivot 423 while wiper 424 is connected to bottle 418 at pivot 425. Within pivot 423 and pivot 425 are springs 427 that urge wiper 422 in the direction of arrow A and urge wiper 424 in direction of arrow B when wiper 422 and 424 are in the second wiping position 430 as shown in FIG. 11.

Maintaining wiper 422 and 424 from first wiping position 426 is block 434. Block 434 comprises a frustroconical hollow insert that is sized to be received within bottle 418, although the block need not be limited to this form and may have other shapes. Block 434 preferably has inclined surface 462 that engages wipers 422 and 424 and facilitates insertion of block 434 between wipers 422, 424. When block 434 is withdrawn in the direction of arrow E, as shown in FIG. 12, to first block position 442, wipers 422 and 424 move in the direction of arrow A and the direction of arrow B, respectively, because of their spring bias toward first wiping position 426. In first wiping position 426, as shown in FIG. 12, wipers 422 and 424 contact applicator 414, including brush 415, so that when applicator 414 is withdrawn, wipers 422 and 424 wipe excess oil off applicator 414. In this way, wipers 422 and 424 automatically engage applicator 414 so that applicator 414 may be wiped simply by withdrawing block 434 and applicator 414 in the direction of arrow E. From there, applicator 414 may be used to apply a controlled amount of mascara to an eyelash.

Moreover, as shown in FIG. 12, wipers 422 and 424 are located within bottle 418. This permits mascara wiped from applicator 414 to be returned to fluid reservoir 458 because wiped mascara remains in bottle 418. After applicator 414 is withdrawn in the direction of arrow E, it may then be reinserted into bottle 418 by moving it in the direction of arrow F. Now, applicator 414 is exposed to fluid reservoir 458.

Figure 13:
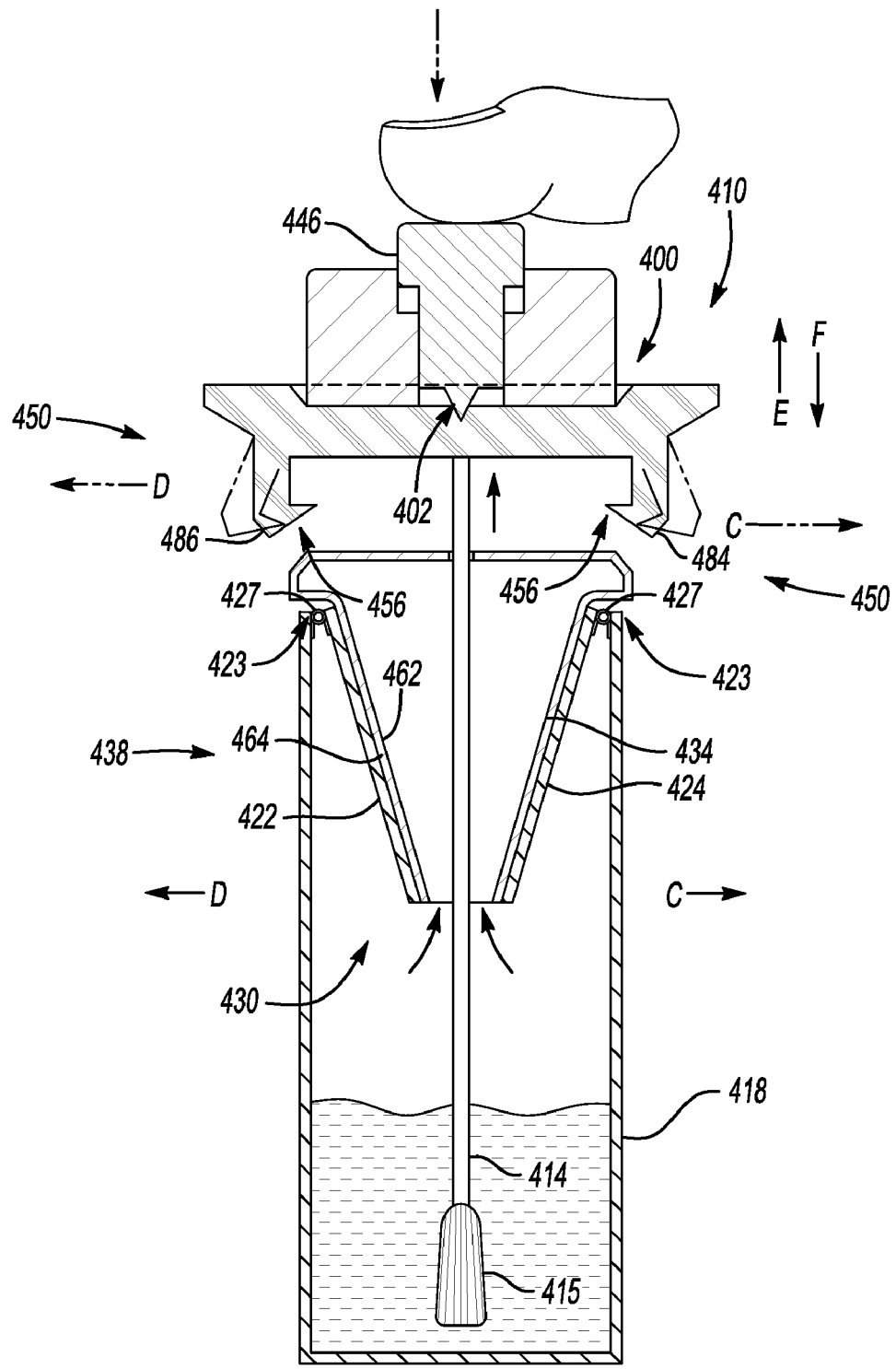
FIG. 13 illustrates the block of FIGS. 11 and 12 in a position to place the wipers in a second wiping position.

As shown in FIG. 13, block 434 is releasably coupled to applicator 414 by catches 484, 486, which are formed as part of cap 400. Cap 400 is connected to applicator 414. Block 434 is shown in unreleased position 454 in FIGS. 11 and 12. Cap 400 and catches 484, 486 are made of a resilient material, such as plastic. Release 446 is slideably received in cap 400 and may move in the direction of arrow F to apply pressure to break 402, which is a channel in the plastic to permit flexing of catches 484, 486 in the direction of arrows C and D, respectively. To prevent applicator 414 from being wiped again, as shown in FIG. 13, release 446 is actuated by depressing it in the direction of arrow F. This action causes catches 484, 486 to bend resiliently in the direction of arrow C for catch 484 and in the direction of arrow D for catch 486. Catches 484 and 486 accordingly pivot away from block 434 to release block 434 to released position 450 wherein block 434 is no longer coupled to catches 484 and 488 and consequently applicator 414. Block 434 has a hollow 464 that permits applicator 414 to slide freely within block 434 when block 34 is released from cap 400. When applicator 414 is moved in the direction of arrow E and lifted from bottle 418, as shown in FIG. 3, block 434 is left in second block position 438 to prevent wiper 422 and 424 from contacting applicator 414, maintaining wipers 422, 424 in second wiping position 430. Hence, when applicator 414 is withdrawn, wipers 422 and 424 will not wipe applicator 414 including brush 415.

Figure 14:
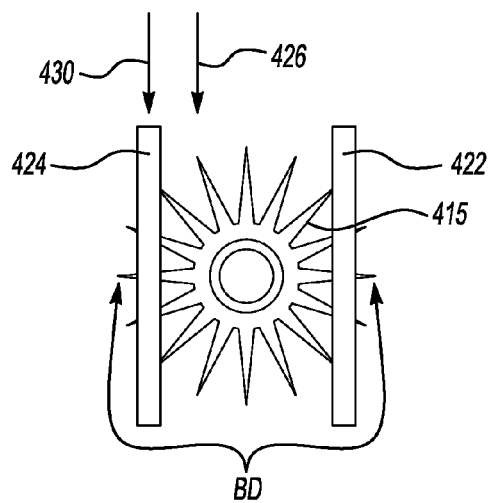
FIG. 14 shows another view of the wipers and applicator of FIGS. 11-13.

Alternatively, as seen from an overview, as shown in FIG. 14, wipers 422 and 424 can be spaced so that they wipe brush 415 having brush diameter, BD, in varying amounts. FIG. 14 shows the position of wipers 422 and 424 relative to brush 415 from a bottom of bottle 418 view. Here, first wiping position 426 is shown closer to brush 415 than second wiping position 430, which is still in contact with brush 415.

Figure 15:
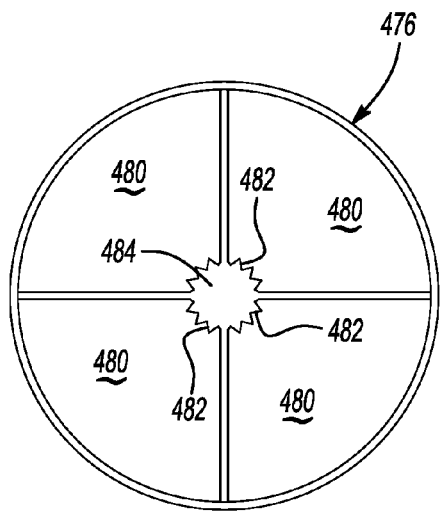
FIG. 15 shows an alternative version of wipers.
Figure 16:
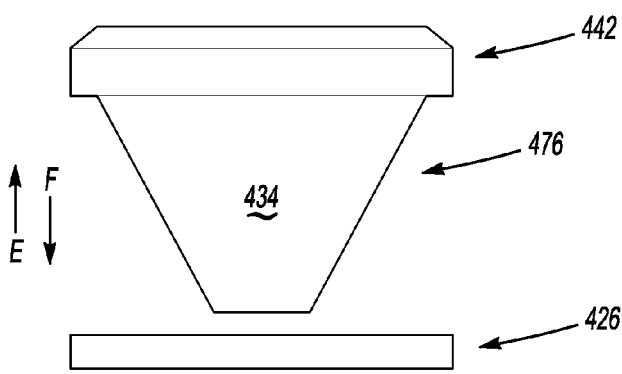
FIG. 16 shows another a view of the wipers of FIG. 15.
Figure 17:
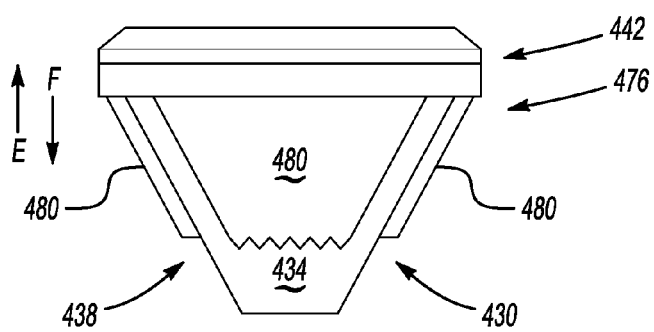
FIG. 17 shows another view of the wipers of FIGS. 15 and FIG. 16.

FIG. 15-17 show alternative wiper arrangement 476. FIG. 15 shows wiper arrangement 476 from a bottom of bottle 514 view while FIGS. 16-17 show wiper arrangement 476 from a side of bottle view. In these figures are shown four wipers, 480, which when in first wiping position 426 as shown in FIG. 15, form a resiliently biased aperture 484 (see FIG. 15), sized a little smaller than the overall diameter of brush 415. Wipers 480 may be firm rubber flaps or, alternatively, may be spring biased to close like the wipers of FIGS. 11-13. Wipers 480 preferably have serrated edges 482 that help clean brush 415.

Wipers 480 are movable between first wiping position 426 shown in FIG. 16 and second wiping position 430 shown in FIG. 17 in the direction of arrow E and F as described in the version shown in FIGS. 11-13 by movement of block 434. When block 434 is in first block position 442 as shown in FIG. 16, wipers 480 are in first wiping position 430 as shown in FIGS. 15 and 16. When block 434 is moved in the direction of arrow F to second block position 438, then wipers 480 are opened to second wiping position 430 shown in FIG. 17. In second wiping position 430, aperture 484 is larger and wipers 480 have subsequently decreased (or no) contact with brush 415. If block 434 is moved in the direction of arrow E back to first block position 442, the resiliency of wipers 480 urges them to first wiping position 430 shown in FIG. 16. It will be appreciated that several wiping positions can be created by movement of block 434 at any position between directions E and F. In this manner, varying degrees of mascara will be wiped off brush 415 by virtue of the degree of contact wipers 480 have with brush 415 as permitted by block 434.

Figures 18, 19:
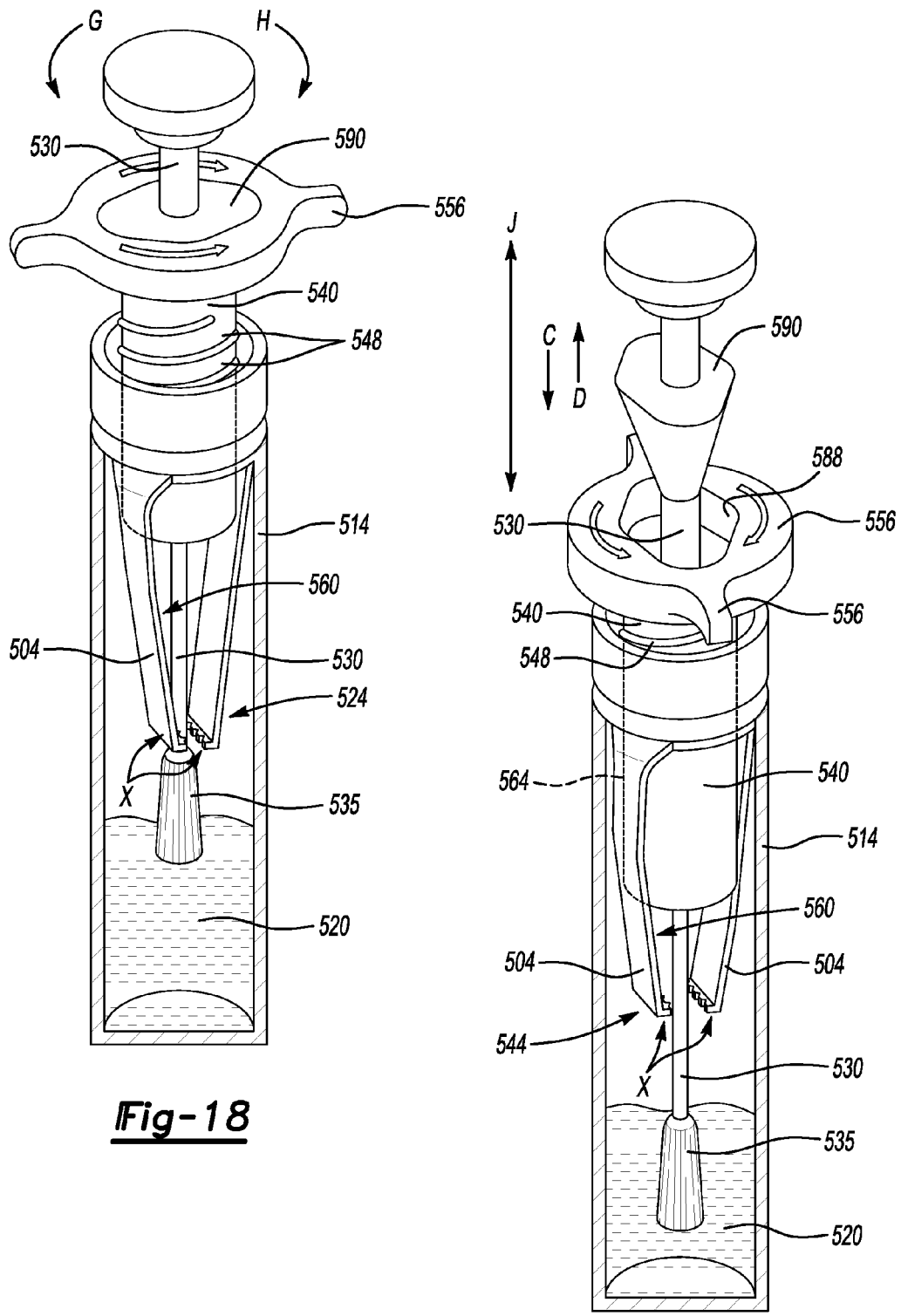
FIG. 18 shows an alternative version of a cosmetic bottle assembly with wipers in first wiping position.
FIG. 19 shows the cosmetic bottle assembly of FIG. 18 with wipers in second wiping position.
Figures 20, 21:
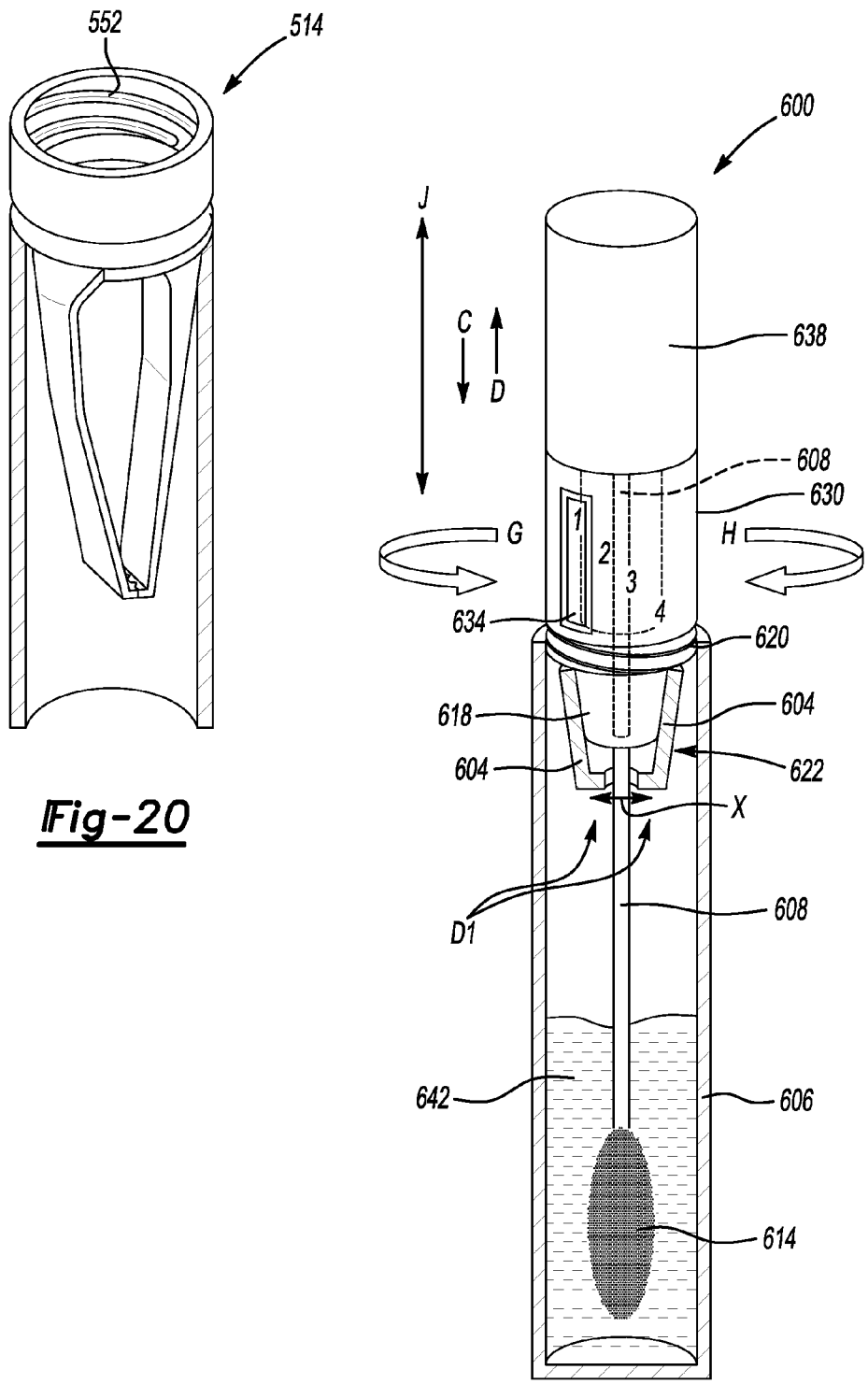
FIG. 20 shows the cosmetic bottle assembly of FIGS. 18 and 19, highlighting the threading of the bottle.
FIG. 21 shows another version of a cosmetic bottle assembly with wipers in first wiping position.

Another version of a fluid reservoir wiper assembly is shown in FIGS. 18-20. There is shown cosmetic bottle assembly 500 having fluid 520, say for a mascara. Cosmetic bottle assembly 500 has wipers 504, each resiliently biased to first wiping position 524 as shown in FIG. 15 and movable by block 540 to second wiping position 544. In addition, applicator 530 with brush 535 is shown disposed in fluid reservoir 520.

Block 540, a cylinder, has threads 548 and is threadedly received by bottle 514, which has mating threads 552 as shown in FIG. 20. Block 540 has integrally formed handle 556. Block is movable along block path J, either in the direction of arrow C into bottle 514 or in the direction of arrow D out of bottle 514. Turning handle 556 and therefore block 540 in the direction of arrow G moves block 540 in the direction of arrow D while turning in the direction of arrow H moves block 540 in the direction of arrow C.

As shown, wiper 504 has wiper surface 560, which is angled and extends transversely to block surface 564. Wiper 504 extends transversely across block path J. Accordingly, movement of block 540 in the direction of arrow C moves wipers 504 away from each other while movement in the direction of arrow D moves wipers 504 toward each other. In this way, the distance X between wipers 504 can be increased or decreased simply by turning handle 556 in the direction of arrow G or the direction of arrow H, thereby providing a way to vary the level of wiping by wipers 504.

Hence, FIG. 18 shows wipers 504 in first wiping position 524 while FIG. 19 shows wipers 504 in second wiping position 544. As shown, first wiping position 524 is closer to applicator 530 than second wiping position 544. First wiping position 524 provides maximum wiping of brush 535 by wipers 504. Second wiping position 544 may provide no wiping or minimal wiping of brush 535 by wipers 504. In this version, a multiplicity of wiping positions between first wiping position 524 and second wiping position 544 are available by adjusting the amount of turning of handle 556.

Block 540 is a hollow cylinder and has hole 588 that receives applicator 530. Applicator 530 may be withdrawn from bottle 514 and block 540 in the direction of arrow D without brush 535 contacting the sides of hole 588. Withdrawing applicator 530 in this direction causes applicator 530, including brush 540, to be wiped by wipers 504. Applicator 530 also has stop 590, which is conically tapered. Hole 588 is also conically tapered and sized to match stop 590. Hole 588 is accordingly shaped to receive stop 590 and prevent stop 590 from passing all the way through hole 588 to bottom of bottle 514 because of hole 588's tapering shape.

FIGS. 21-22 show another variation of the invention, cosmetic bottle assembly 600 with fluid reservoir 642 for storing a fluid such as mascara. Cosmetic bottle assembly has wipers 604, applicator 608 with brush 614, and block 618—all shown disposed in bottle 606. Wipers 604 are resiliently biased towards each other.

Handle 630 is integral with block 618. Block 618 and handle 630 are hollow to receive applicator 608, which may move along path J, independently of handle 630 and block 618 as shown in FIG. 23. In addition, applicator handle 638 has protrusions 650, which may be slideably received by mating holes 654 of handle 630. When protrusions 650 are engaged to holes 654, applicator handle 638 is rotatable with handle 630 in the direction of arrow G or arrow H to move block 618. Further like the version shown in FIGS. 18-20, block 618 has threads 620 (see FIGS. 21-22) and bottle 606 has mating threads (not shown). Accordingly, block 618 is threadedly engaged to bottle 606 so as to move in the direction of arrow D when handle 630 is turned (directly or by turning engaged applicator handle 638) in the direction of arrow G and to move in the direction of arrow C when handle 630 is turned in the direction of arrow H. By moving block 618 in the direction of either arrow C or arrow D, the distance X between wipers 604 can be adjusted to increase or decrease the level of wiping. Handle 630 has level indicator 634, which is numbered "1" through "4", with number "1" indicating the highest level of wiping and number "4" indicating the lowest level of wiping. In this manner, the user will achieve a known predetermined amount of mascara, as the maximum amount of mascara will remain on brush 415 when the level indicated is "4" while turning clockwise towards lower levels "3", "2" and "1" will result in decreasing amounts of mascara remaining on brush 415.

Applicator 608 may be inserted in the direction of arrow C and withdrawn in the direction of arrow D from bottle 606 along path J through applicator handle 638 without contacting block 618 and handle 630 as shown in FIG. 23. Withdrawing applicator 608 in this manner allows brush 614 to be automatically wiped by wipers 608. FIG. 21 shows wipers 604 at first wiping position 626. Here, handle 630 is shown at level "1", with wipers 604 in their closest position, a distance D1 apart. Distance D1 ensures maximum level of wiping of brush 614 of applicator 608 when applicator 608 is withdrawn in the direction of arrow D along path J. To adjust the level of wiping, handle 630 is turned in the direction of arrow H to a higher level, say level "3", to move block 618 in the direction of arrow C, which widens distance X between wipers 604 to distance D2, a distance greater than D1. At level "3", there is less pressure on brush 614 of applicator 608 when withdrawn in the direction of arrow D along path J. In this way, the level of wiping of brush 614 can be adjusted conveniently and simply in fixed amounts and without mess.

Figure 24:
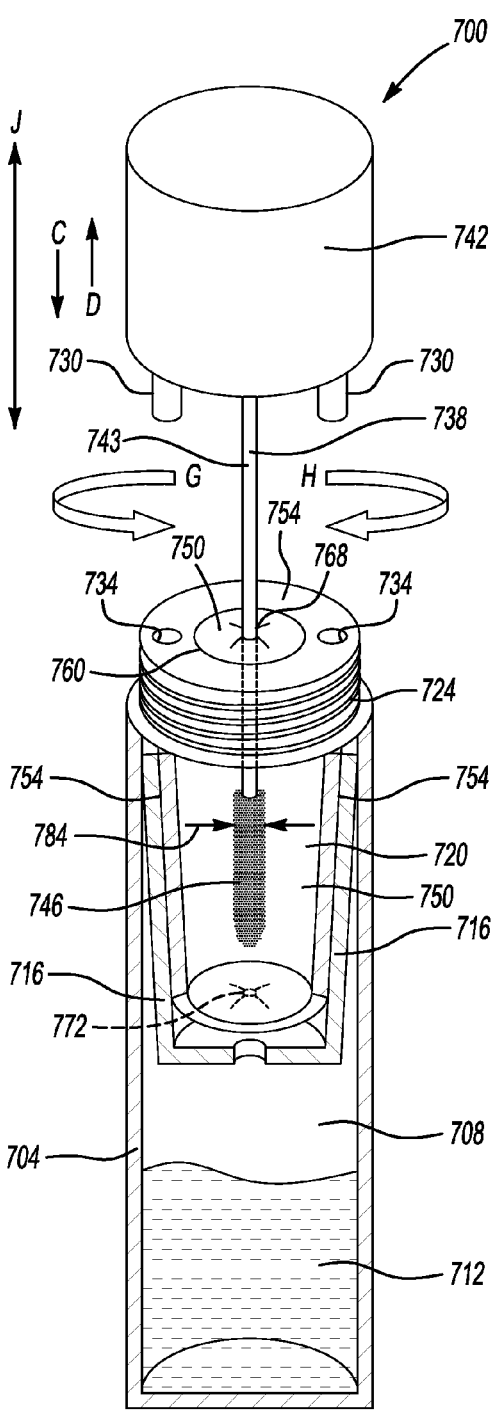
FIG. 24 shows another version of a cosmetic bottle assembly.
Figure 25:
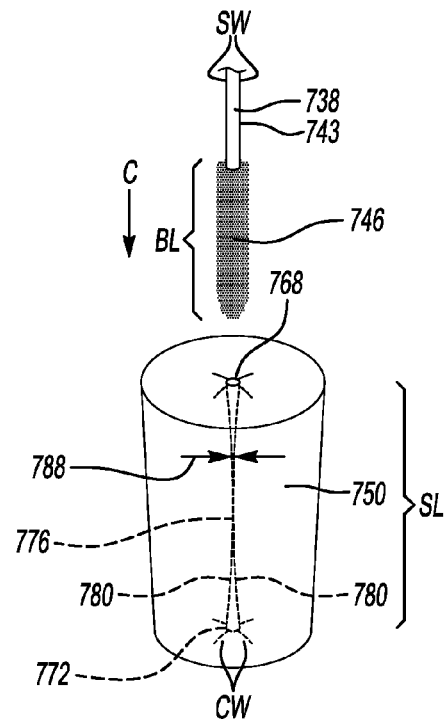
FIG. 25 shows a sealing body of the cosmetic bottle assembly of FIG. 24.
Figure 26:
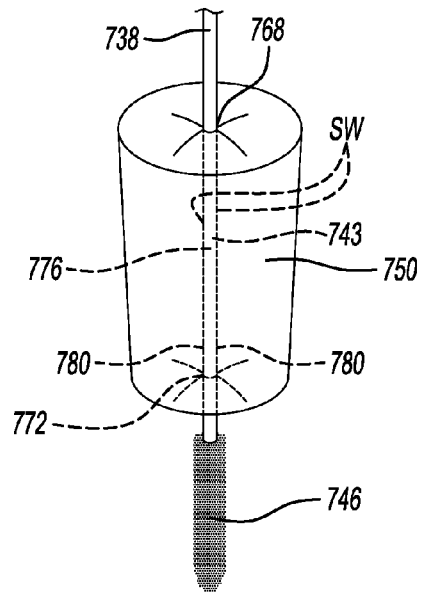
FIG. 26 shows the sealing body of FIG. 25 with applicator disposed therein.

FIGS. 24-26 show another version of a cosmetic bottle assembly. Here, as shown in FIG. 24, cosmetic bottle assembly 700 has bottle 704 having fluid reservoir 708 with cosmetic fluid 712, here mascara. Disposed within bottle 704 are wipers 716, which are resiliently biased towards each other. Also disposed in bottle 704 is block 720. Block 720 has threads 724, which are threadedly received by bottle 704, which has mating threads (not shown).

Applicator 738 has applicator handle 742, stem 743 having stem width, SW, and brush 746 having brush length, BL. Applicator handle 742 has protrusions 730 that are slideably engageable to holes 734 of block 720. When protrusions 730 are engaged in holes 734, applicator handle 742 is rotatable with block 720. As in the version shown FIG. 21-23, turning applicator handle 742 in the direction of arrow G moves block 720 in the direction of arrow D while turning in the direction of arrow C moves block 720 in the direction of arrow C. Movement of block 720 causes wipers 716 to move closer or farther apart like the version of FIG. 21-23.

Unlike the prior version, block 720 of cosmetic bottle assembly 700 comprises sealing body 750 covered by casing 754. Casing 754 is a rigid frustroconical shell that encases sealing body 750 and has threads 724 to engage bottle 704. Casing 754 further has openings 760 that are wide enough to allow brush 746 of applicator 738 to pass through without contact if moved along path J. Casing 754 retains sealing body 750 and discourages movement in the direction of arrow C or arrow D when applicator 738 is moved in these same directions.

Sealing body 750 provides a seal for bottle 704 to prevent drying and clumping of cosmetic fluid 712. Sealing body 750 is a resilient material, such as silicone rubber. As shown in FIG. 25, sealing body 750 has channel 776 having a channel width, CW, with first opening 768 and second opening 772 spaced a sealing body length, SL, apart. Due to the highly resilient nature of sealing body 750, channel 776, first opening 768 and second opening 772 is resiliently flexible between two widths, first width 784 and second width 788. First width 784 is shown in FIG. 24 and is large enough to accommodate applicator 738, including brush 764. Second width 788 is shown in FIG. 25 and is preferably small enough to help prevent air from passing along path J to enter bottle 704 and drying out cosmetic fluid 712. Channel 776, first opening 768 and second opening 772 are resilient biased towards second width 788.

When brush 764 is inserted in the direction of arrow C into sealing body 750 of block 720, first opening 768 and channel 776 enlarge to first width 784 to accommodate brush 764. Because of resilient bias toward second width 788, when brush 764 is in the position shown in FIG. 24, first opening 768 and channel 776 sealingly encase applicator 738 while second opening 772 remains at second width 788. In this position, bottle 704 is still sealed by sealing body 750.

As shown in FIG. 26, when brush 764 has been inserted passed sealing body 750, first opening 768, channel 776 and second opening 772 have enlarged to accommodate applicator 738. However, due to the resilient nature of sealing body 750, a seal is still created along the length of applicator 738 by channel wall 780, which, due to the resilient nature of sealing body 750, continues to squeeze applicator 738. In this way, bottle 704 remains sealed at all times, preventing the drying and clumping of cosmetic fluid 712. Moreover, silicone rubber is non-absorbent. Consequently, withdrawal of applicator 738 through sealing body 750 will not affect wiping of brush 746 significantly so that most wiping can be accomplished by wipers 716.

Figure 27:
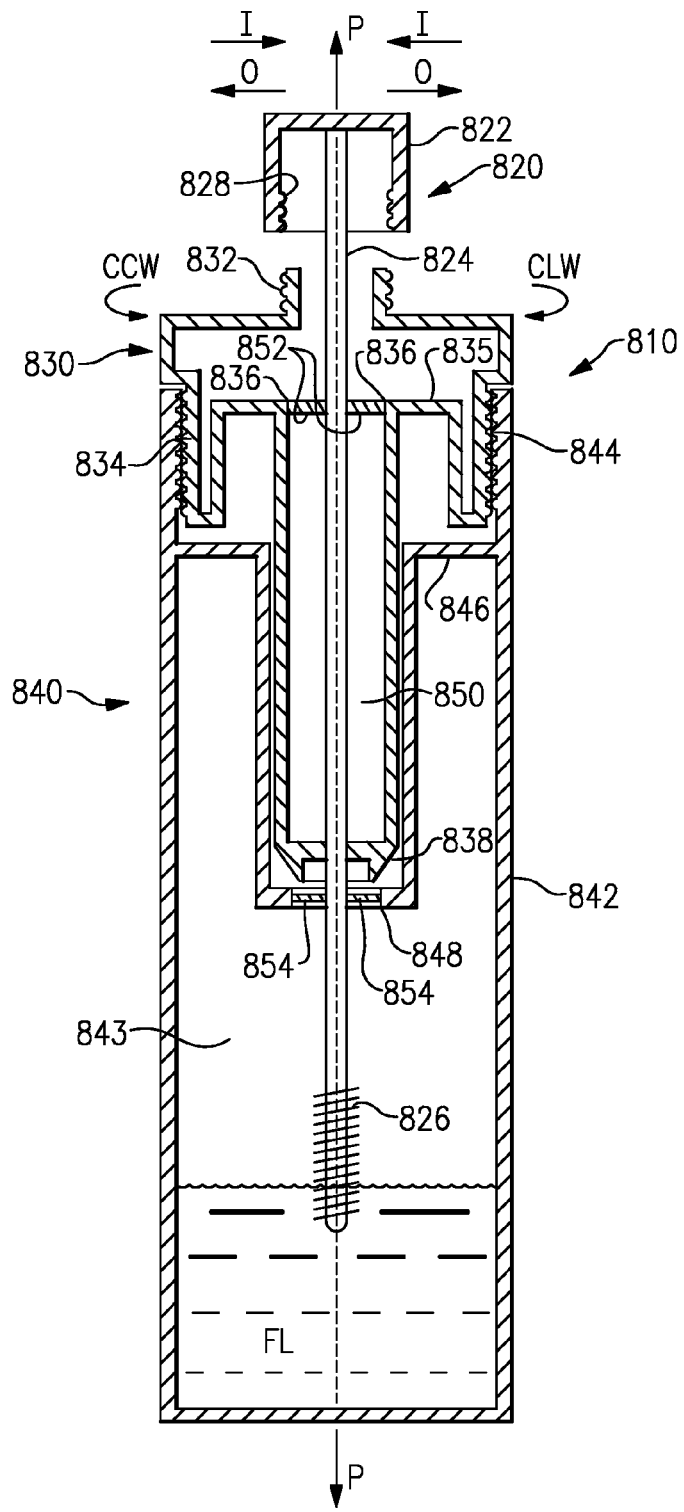
FIG. 27 is a sectional view of another disclosed fluid reservoir assembly.

FIG. 27 is a sectional view of another disclosed bottle assembly 810, or fluid reservoir assembly. The bottle assembly 810 is generally cylindrical, and is shown sectioned along its central axis, which in this case coincides with the path P. Of course, the bottle assembly 810 need not be limited only to cylindrical bottles. The shown bottle assembly 810 includes an applicator assembly 820, an upper housing section 830, and a lower housing section 840.

The applicator assembly 820 includes a cap 822 with a stick 824, or stem, extending downwardly therefrom. At an end opposite the cap 822, the stick 824 includes a brush 826, or other generic applicator. The brush 826 may include bristles adapted to carry fluid FL, which may be mascara, from the bottle assembly 810 and to apply the fluid FL onto a user's eyelashes, for example. As is generally shown, the applicator assembly 820 is generally movable along the path P. The cap 822 also may include threads 828 to engage with a first set of threads 832 of the upper housing section 830, thereby allowing a user to essentially close and seal the top of the bottle assembly 810. Notably, it is not necessary for the cap 822 to be threaded onto the upper housing section 830, and the cap 822 could be connected to the upper housing section 830 in another manner.

The upper housing section 830 is rotatable relative the lower housing section 840 in both clockwise and counter-clockwise directions CLW, CCW via a second set of threads 834 engageable with threads 844 of the lower housing section 840. Tabs or other features may be provided to increase the ease by which a user can rotate the upper housing section 830. The upper housing section 830 further includes an inwardly projecting flange 835 supporting an upper seal 852 (or upper membrane 852) around the path P. A lower portion of the upper housing section 830 includes a tapered section 838, here a frustoconical shape, which may block deflection of a lower seal 854 (or lower membrane 852). The tapered section 838 is provided proximate the lower seal 854 and below the inwardly projecting flange 835. As explained in detail below, rotation of the upper housing section 830 relative to the lower housing section 840 moves the tapered section 838 along the path P relative to the lower seal 854. This will determine the degree in which tapered section 838 will act to block deflection of lower seal 854. While it may be preferred that the tapered section 838 be tapered, the tapered section 838 may alternatively not be tapered, and may instead include a shouldered inner diameter.

The lower housing section 840 is generally defined by a main body portion 842 in which a reservoir 843, which retains fluid FL, is defined. The reservoir 843 here is shown as being constrained by both the main body portion 842 and the lower seal 854. As shown, the main body portion 842 includes an inwardly projecting flange 846 that supports the lower seal 854 around the path P by way of a lower support structure 848. An appropriate size for the reservoir 843, may be selected, as appropriate. For example, a relatively small reservoir 843 would decrease the amount of air within the reservoir 843 as well as concentrate the fluid FL close to the brush 826. By concentrating the fluid FL in this manner, the fluid FL would be substantially prevented from spreading within the reservoir 843, and thus further evaporation and drying may be avoided.

An antechamber 850 is defined between the upper seal 852 and the lower seal 854 (e.g., the "space" or "buffer" of air between the upper and lower seals 852, 854). In one example, when traveling along the path P, the brush 826 only passes through one of the upper and lower seals 852, 854 at a time. That is, if the brush 826 is positioned in the reservoir 843 and extracted outward (or, removed), the brush 826 would completely pass through the lower seal 854 before contacting the upper seal 852. Likewise, when inserting the brush 826 into the bottle assembly 810, the lower seal 854 would remain closed while the brush penetrates (or, initially breaches or contacts) the upper seal 852. In this manner, the brush 826 may separately pass through the seals 852, 854 to substantially prevent unwanted air from entering the fluid reservoir 843 by virtue of the upper and lower seals 852, 854 and the buffer of air in the antechamber 850. Preferably, there should be adequate spacing between the upper and lower seals 852, 854 in order to fully provide for this functionality (e.g., to create an adequate antechamber 850). However, the seals 852, 854 may be spaced so that the brush 826 simultaneously contacts the seals 852, 854 when passing through the antechamber 850. Further, and as explained in detail below, the seals 852, 854 are configured to tightly wrap around the stick 824 and the brush 826 so that air is substantially prevented from entering the reservoir 843. It may also be important to prevent air within the reservoir 843 from exiting the reservoir, and to hinder the exchange of inside and outside air. Loss of this inside air, which may be saturated, would not be desirable as it would lead to a loss of moisture content resulting in drying of the fluid FL.

Figure 28A:
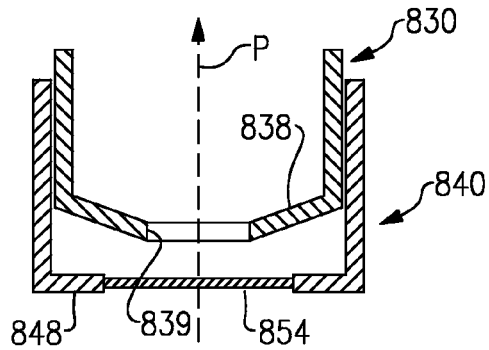
FIG. 28A is sectional view of the fluid reservoir assembly of FIG. 27 showing the tapered section in a non-blocking position, and showing the lower seal in a neutral position.

Referring now to FIGS. 28a-29b, a blocking feature, allowing for adjustable wiping of the brush 826, is described. FIG. 28a shows the tapered section 838 in a non-blocking position (or, a first position) where deflection of the lower seal 854 will not cause the lower seal 854 to engage the tapered section 838. As shown, the brush 826 is removed, and the lower seal 854 is in a neutral, or relaxed, position.

Figure 28B:
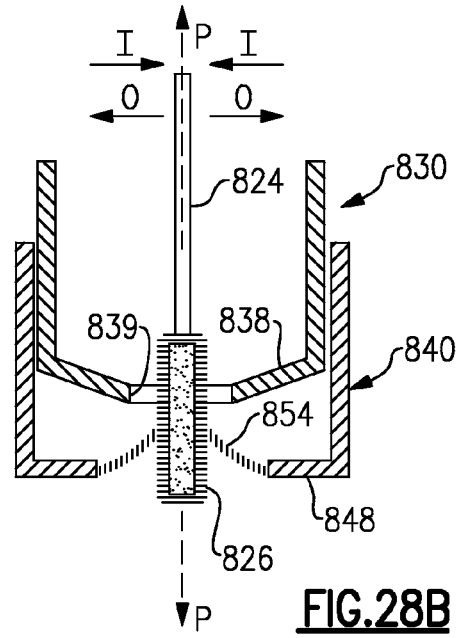
FIG. 28B is sectional view of the fluid reservoir assembly of FIG. 27 showing the lower seal in a fully unblocked state, with the brush passing upwardly through the lower seal.

FIG. 28b shows the brush 826 passing through the lower seal 854, wherein the lower seal 854 is in fully unblocked state. That is, because the tapered section 838 is in a non-blocking position, the lower seal 854 is not in engagement with—or, is not in substantial engagement with—the tapered section 838. In this unblocked state, the lower seal 854 is permitted to fully deflect away from the path P (e.g., in a generally radially outward direction O) as dictated by the force imparted to the lower seal 854 by the extraction of the brush 826. Because the lower seal 854 can deflect away from the path P in this manner, the lower seal 854 wipes a relatively small amount of fluid FL from the brush 826.

Figure 29A:
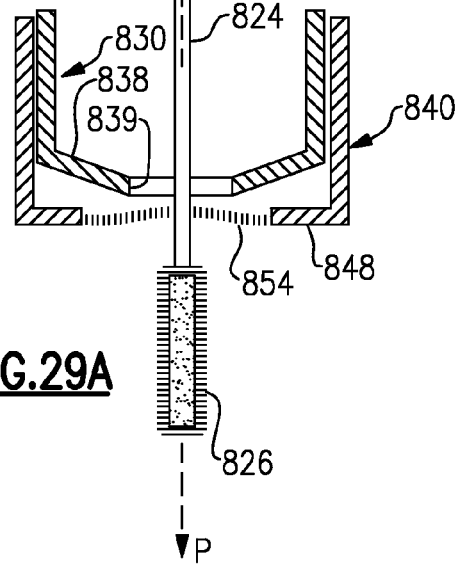
FIG. 29A is a sectional view of the fluid reservoir assembly of FIG. 27 showing the tapered section in a blocking position, with the brush positioned below the lower seal.

In FIG. 29a, the tapered section 838 is shown in a blocking position (or, a second position) wherein the tapered section 838 will block deflection of the lower seal 854 as the brush 826 is pulled along path P to exit the bottle. In the blocking position, the tapered section 838 is lowered along the path P by rotation of the upper housing section 830 in the clockwise direction CLW, for example. That is, the tapered section 838 is positioned closer to the lower seal 854 than when the tapered section 838 is the non-blocking position (or, first position).

Figure 29B:
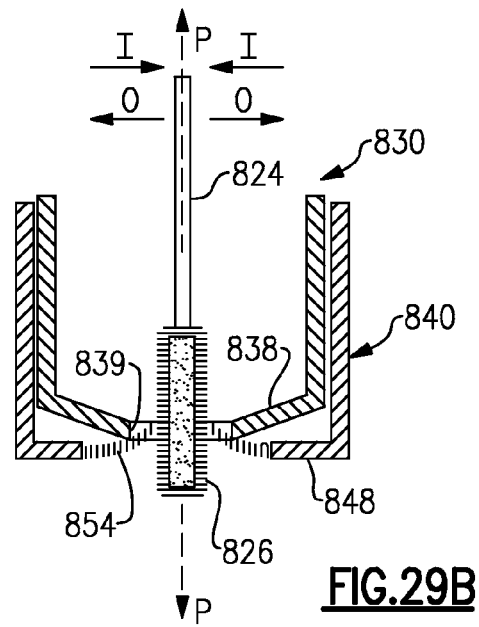
FIG. 29B is a sectional view of the fluid reservoir assembly of FIG. 27 showing the lower seal in a fully blocked state, with the brush passing upwardly through the lower seal.

In FIG. 29b, the brush 826 is shown passing through the lower seal 854 with the tapered section 838 in the blocking position. The lower seal 854 is shown in a fully blocked state wherein the tapered section 838 restricts movement of the lower seal 854 in the radially outward direction O away from the path P. Specifically, extraction of the brush 826 causes the lower seal 854 to deflect obtusely away from the path P in the radially outward direction O, however the deflection of the lower seal 854 is limited by the tapered section 838. That is, the lower seal 854 is prevented from opening beyond the diameter of the inner surface 839, which is a diameter relatively close to the size of the brush 826. While the diameter of the inner surface 839 is set at its manufacture, one may determine the diameter of the inner surface 839 depending on a desired amount of wiping to be performed the lower seal 854 (e.g., when the diameter of the inner surface 839 is closer to the size of the brush 826, the amount of wiping performed by the lower seal 54 will increase). In particular, the inner surface 839 of the tapered section 838 urges the lower seal 854 in a radially inward direction I toward the path P against the deflection caused by the extraction of the brush 826. A relatively large amount of fluid FL is thus wiped from the brush 826 by the lower seal 854 relative to when the tapered section 838 is in the non-blocking position of FIGS. 28a-28b, for example. In this way, a user may selectively adjust the amount of fluid FL to be wiped from the brush 826 during extraction (e.g., the level of wiping performed by the lower seal 854 may be adjusted) simply by rotating the upper housing section 830.

Notably, because the upper seal 852 is not blocked in the same manner as the lower seal 854, the amount of fluid FL remaining on the brush after being wiped by the lower seal 854 remains substantially unchanged by any wiping of the brush 826 performed by the upper seal 852. While the upper seal 852 may cause minimal wiping of the brush, this wiping will tend to distribute the fluid FL evenly along the length of the brush 826, thus avoiding clumping of the fluid FL, as is typical of mascara, for example. By providing the tapered section 838 along with the ability to block the lower seal 854, a user is allowed to accurately select a desired amount of fluid FL to be carried out of the bottle assembly 810 by the brush 826, while still preventing outside air from entering the reservoir 843.

It should be noted that it is possible to provide an antechamber wherein an upper seal is blocked (similar to the manner in which the lower seal 854 is blocked) and a lower seal is unblocked (similar to the manner in which the upper seal 852 is unblocked). Such an arrangement is within the scope of this disclosure. However, it may be preferred to perform wiping with a lower seal 854, as fluid FL removed by the lower seal 854 would tend to remain in the fluid reservoir 843, whereas substantial wiping of fluid FL with the upper seal 852 would tend to cause an unwanted build up of fluid FL within the antechamber 850.

Further, and while not shown in the drawings, a pre-wiper may be positioned below the lower seal 854, above the upper seal 852, or both. The pre-wiper may be a plastic insert incorporated into the bottle assembly 810 having a simple opening/aperture of similar diameter to the applicator 826, and can be arranged about the path P. In the example that a pre-wiper is positioned below the lower seal 854, the pre-wiper would remove excess fluid FL from the applicator 826 to essentially reduce the amount of wiping to be performed by the lower seal 852, as well as reducing the potential for fluid FL to build up in the antechamber 850. Pre-wipers can be incorporated into the disclosed bottle assembly 810 as desired.

While FIGS. 28a-29b represent blocking and non-blocking positions of the tapered section 838, intermediate positions, providing varying levels of wiping of the fluid FL carried by the brush 826, may further be included. For example, the upper housing section 830 may be rotated to move the tapered section 838 to one or more intermediate blocking positions between the shown blocking and non-blocking positions. These intermediate blocking positions may provide for a level of wiping that is greater than when the lower seal 854 is in the fully unblocked state (e.g., FIG. 28b), and less than when the lower seal 854 is in the fully blocked state (e.g., FIG. 29b). In this sense, the shown blocked and unblocked states may represent the highest and lowest levels of wiping to be performed by the lower seal 854, respectively. Further, the upper housing section 830 and the lower housing section 840 may include markings, as appropriate, so that a user can select a desired level of wiping. Pitch of the threads 834, 844, as well as the shape of the tapered section 838, may affect the relationship between rotation of the housing section 830 and the amount of fluid FL wiped from the brush 826 by the lower seal 854. As one would appreciate, as the tapered section 838 moves (axially) closer to the lower seal 854, amount of wiping performed lower seal 854 will increase.

Furthermore, while not shown in the Figures, the tapered section 838 could include an adjustable, or expandable, aperture. In this case, the tapered section 838 would be axially fixed relative to the lower seal 854, and the end of the tapered section 838 would include an adjustable aperture, such that the diameter of the adjustable aperture may change to provide varying levels of blocking of the lower seal 854. The adjustable aperture may be selectively adjustable by a user, without requiring axial movement of the entire tapered section 838.

Figure 30:
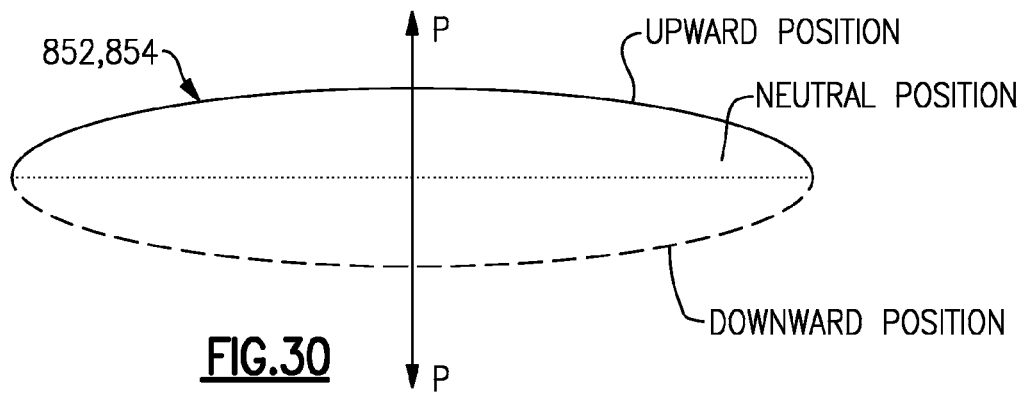
FIG. 30 is representative of the deflection experienced by the seals present in the fluid reservoir assembly of FIG. 27.

Turning now to FIG. 30, different deflections that may be experienced by the seals 852, 854 when in contact with the brush 826 are represented. For example, the seals 852, 854 would generally be deflected to the shown upward position when the brush 826 is extracted from the reservoir 843 along the path P (e.g., the lower seal 854, as shown in FIGS. 28b and 29b). When neither the brush 826 nor the stick 824 is in engagement with the seals 852, 854, the seals 852, 854 will generally return to a neutral, or relaxed, position under the resiliency of the seal (e.g., the lower seal 854, as shown in FIG. 28a). Notably, while the seal is shown generally flat in the neutral position, the seal could generally bow upwardly when in the neutral position. The seals 852, 854 may be any number of resilient materials, such as silicone rubber, and the seals 852, 854 may thus be naturally biased to the neutral position (i.e., the seals 852, 854 have a memory). Of course, the amount of wiping performed by the seals 852, 854 will depend on the flexibility (and other properties) of the material selected for the seals 852, 854. Further, when inserting the brush 826 into the reservoir 843, for example, the seals 852, 854 may be generally deflected to the shown downward position. Of course, the terms "upward" and "downward" are relative to the normal, or upright, positioning of the bottle.

Figure 31A:
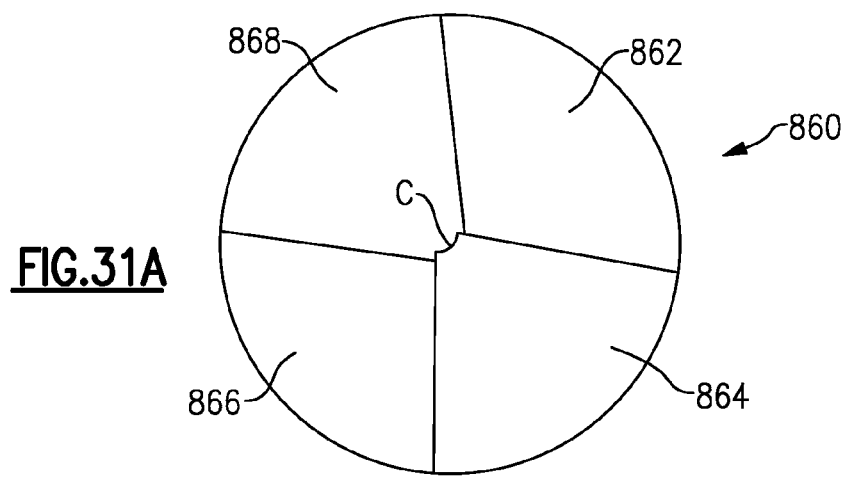
FIG. 31A is a top view of a seals that may be included in the fluid reservoir assembly of FIG. 27.
Figure 32:
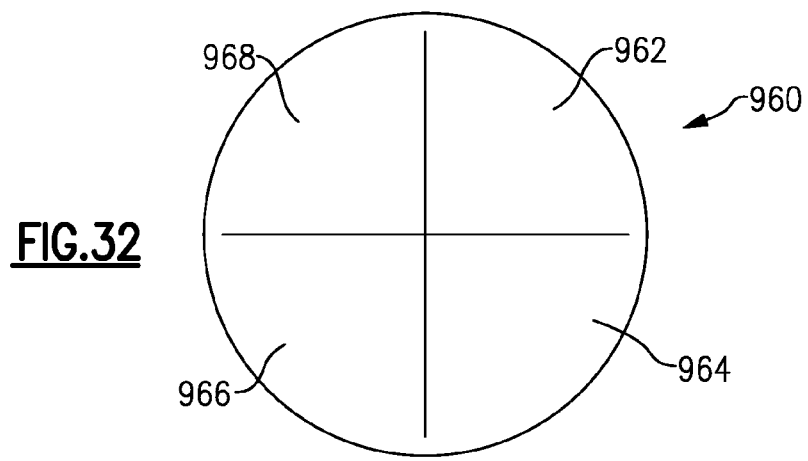
FIG. 32 is a top view another seal that may be included in the fluid reservoir assembly of FIG. 27.

FIGS. 31-32 are representative of two different types of seals, or membranes, 860, 960, that can be implemented as the seals 852, 854 in the bottle assembly 810. As shown, each seal 860, 960 is a circumferential seal, and again, each seal 860, 960 may be made of a resilient material.

Figure 31B:
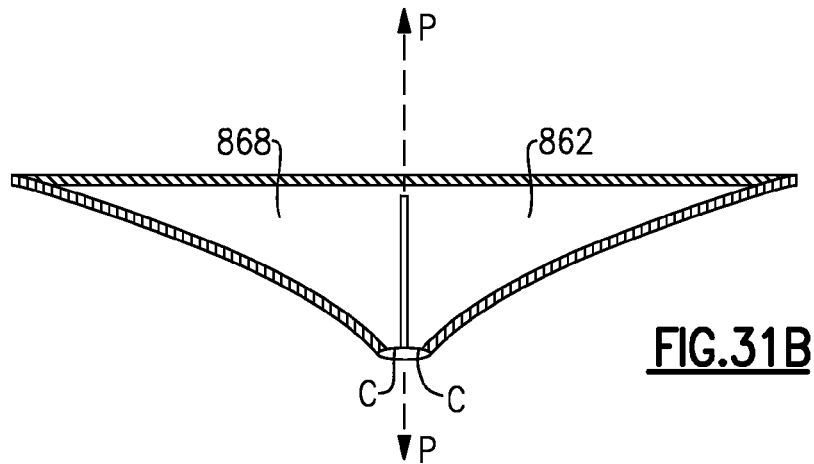
FIG. 31B is a side view of the seal in FIG. 31a in a downward position.
Figure 31C:
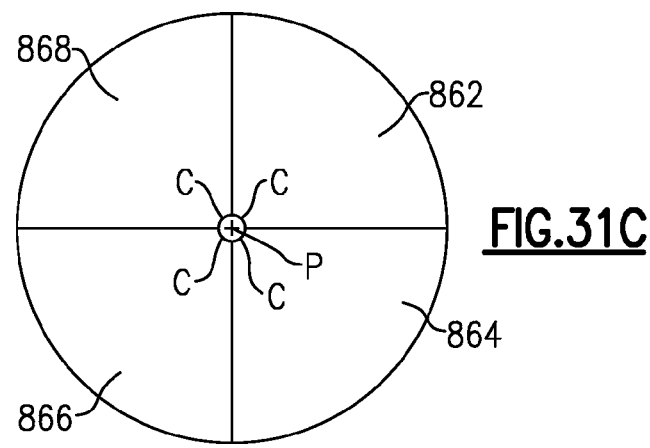
FIG. 31C is a top view of the seal in FIG. 31a in a downward position.

In FIG. 31a, the seal 860 includes four flaps 862, 864, 866, 868. The flaps 862, 864, 866, 868 overlap one another at a center point (e.g., shown as the path P) to further prevent entry of unwanted air beyond the threshold of the seal 860, and to thereby enclose the fluid reservoir FL. Preferably all four overlapping flaps 862, 864, 866, 868 include a cutout C approximating a quarter circle such that the flaps can better seal about the cylindrical stick 824 and the brush 826, for example. When deflected by the stick 24 or brush 26, for example, the flaps 862, 864, 866, 868 align as generally shown in FIGS. 31b-31c. That is, the flaps 862, 864, 866, 868 generally form a conical shape (e.g., as seen in FIG. 31b, which is a sectioned side view of the seal 860 as it is deflected to a downward position), and the cutouts C form a generally circular opening about the path P (e.g., as seen in FIG. 31c, which is a top view of the seal 860 as it is deflected to a downward position) to accommodate the stick 824 or brush 826, as discussed.

Another seal 960, shown in FIG. 32, is similar to the seal 860 from FIGS. 31a-31c, however its flaps 962, 964, 966 and 968 do not overlap, and they do not include cutouts C. The flaps 962, 964, 966 and 968 do contact one another in the neutral position, however, as is generally shown in FIG. 32, which sufficiently prevents the passage of air through the seal 960.

Figure 33:
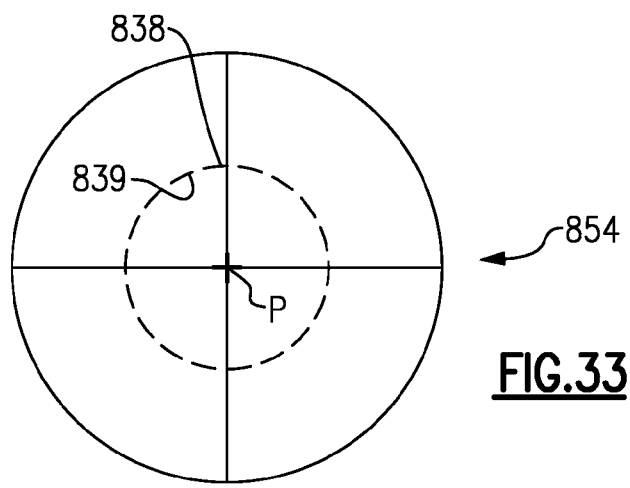
FIG. 33 is a bottom view of the lower seal that may be included in the fluid reservoir assembly of FIG. 27, including a juxtaposed view of the tapered section.

FIG. 33 is a bottom view of the lower seal 854 and is representative of the relationship between the lower seal 854 and the tapered section 838. The inner diameter of the inner surface 839 of the tapered section 838 is preferably less than the diameter of lower seal 854, such that the tapered section 838 intersects the flaps of the lower seal 854 to block the deflection as the stick 824 or brush 826 passes through. The diameter of the inner surface 839 of the tapered section 838 is preferably larger than that of the brush 826, so as to avoid any wiping that may be caused by the tapered section 838.

Figure 34:
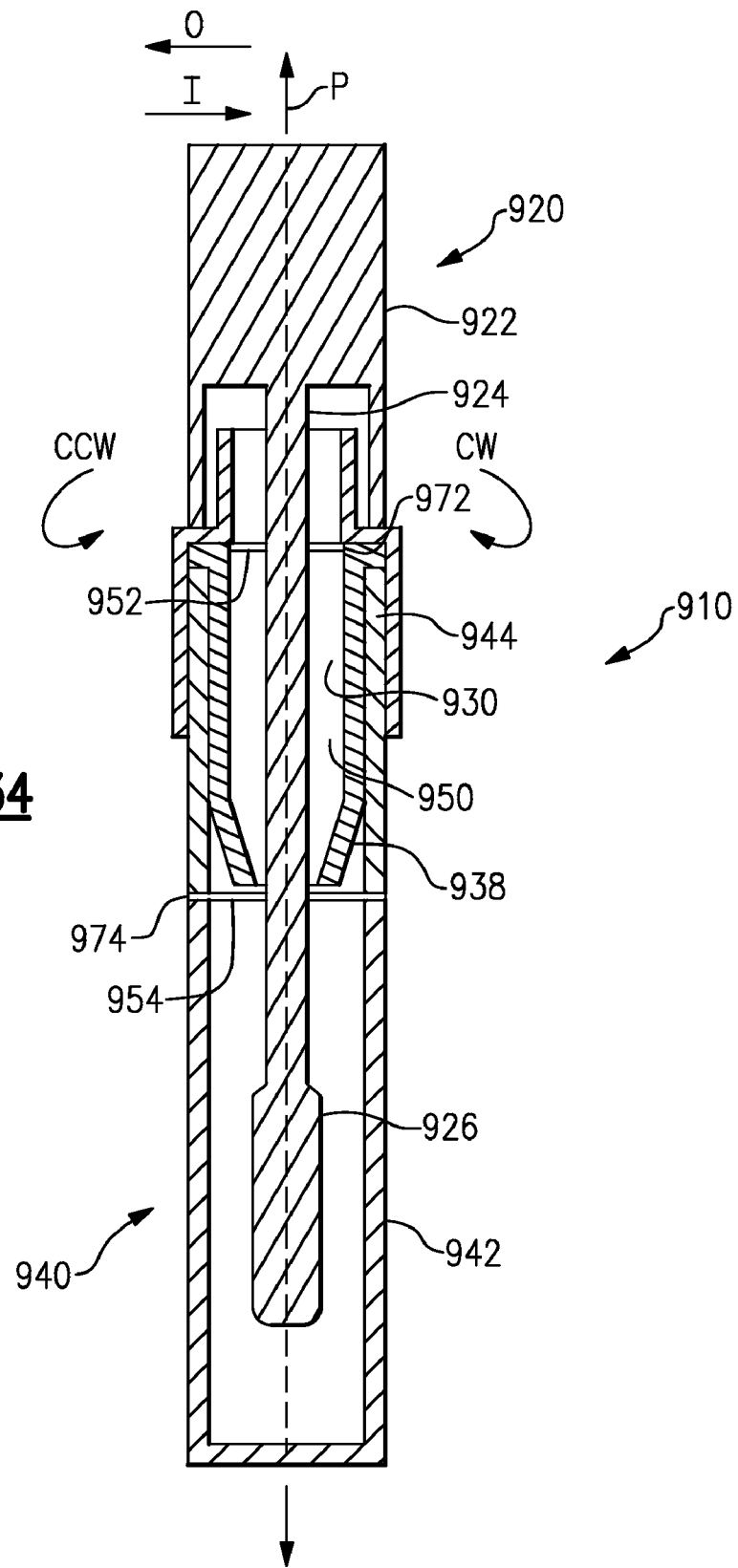
FIG. 34 is representative of another disclosed fluid reservoir assembly.

FIG. 34 shows another disclosed bottle assembly 910. The bottle assembly 910 is substantially similar to the bottle assembly 810. To the extent not otherwise described or shown, the bottle assembly 910 includes parts corresponding to those shown in the bottle assembly 810 of FIG. 27, having corresponding reference numerals preappended with a "9" instead of an "8." Notably, in the bottle assembly 910, the seals 952, 954 may be supported by supports 972, 974 that may be integrally formed in the upper housing section 930 and the lower housing section 940, respectively. In this manner, the need for the inwardly projecting flanges 835, 846 may be eliminated.

Figure 35:
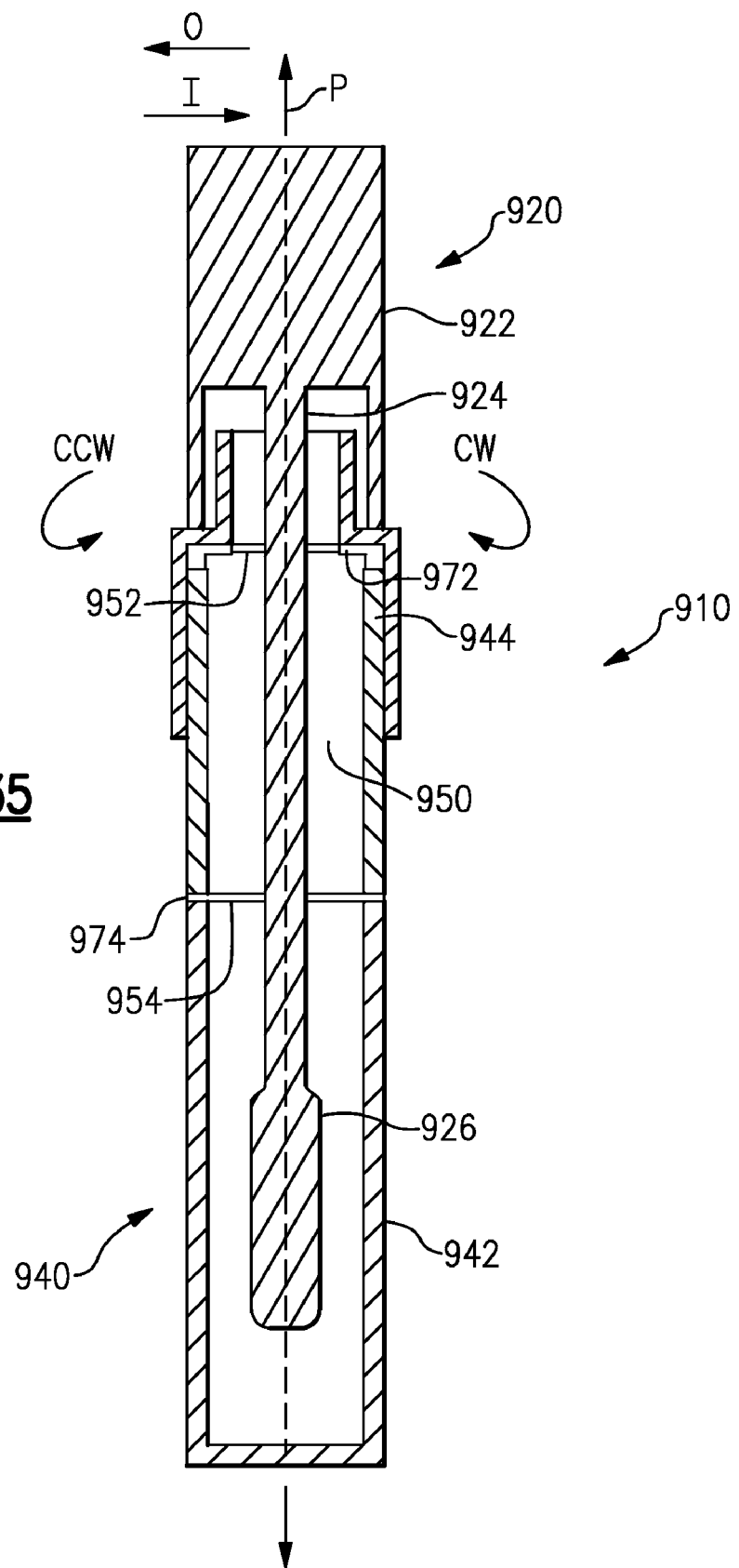
FIG. 35 is representative of another embodiment of the disclosed fluid reservoir assembly, including an antechamber and excluding the blocking feature.
Figure 36:
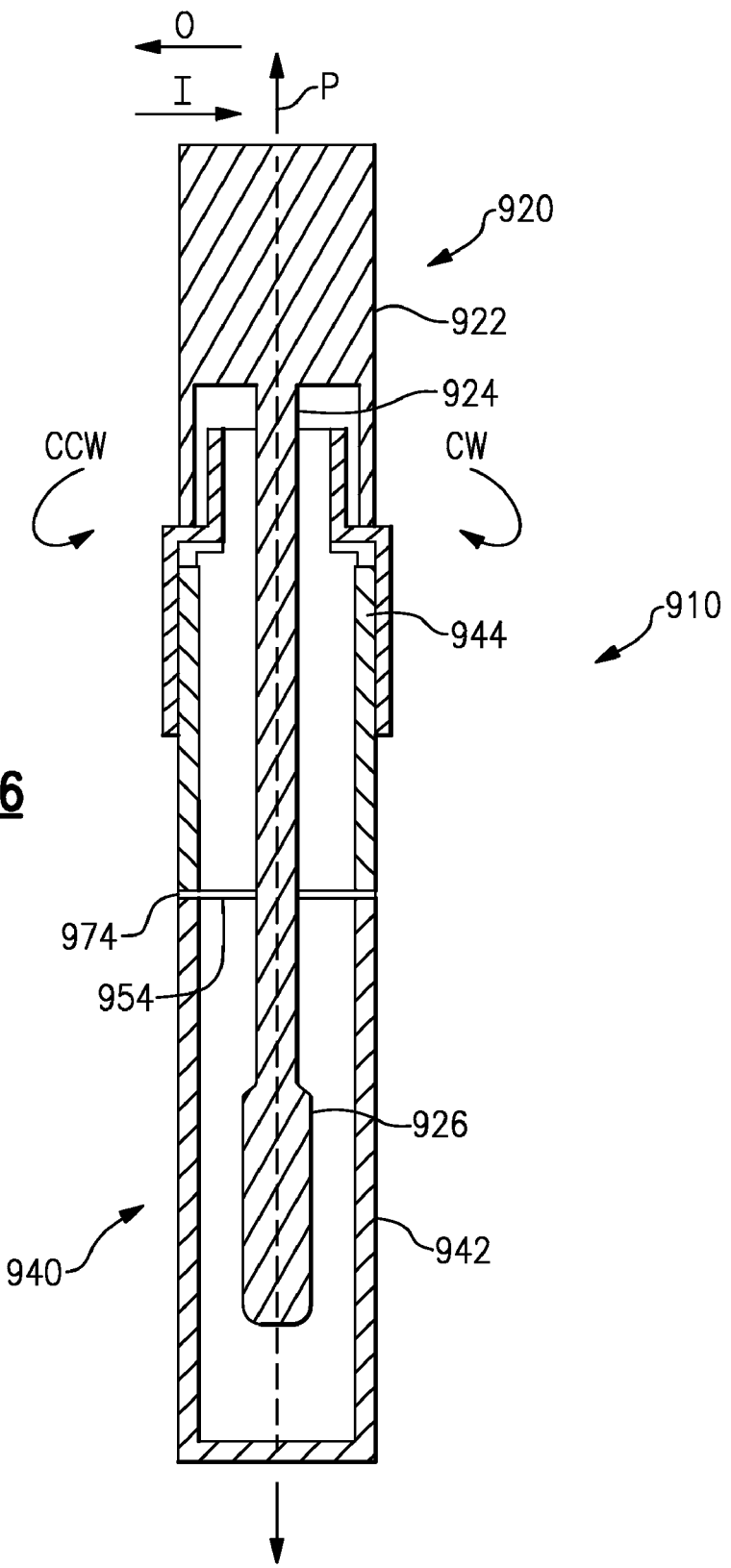
FIG. 36 is representative of yet another embodiment of the fluid reservoir assembly, including a single seal.

While the above-described blocking feature may be useful, the increased wiping control provided by the FIG. 27 embodiment, say, may not be needed in all applications. For example, as represented in FIG. 35, the bottle assembly 910 could exclude the upper housing section 930 and tapered section 938 of FIG. 34, while still including an antechamber 950 defined between upper and lower seals 952, 954. In a further variation, the antechamber 950 may not be needed, and a single seal may be sufficient, as represented in FIG. 36. As shown, the single seal is the lower seal 954, however the single seal could be any single seal, including the upper seal 952. The FIG. 35-36 embodiments can include one or more pre-wipers, as noted above, and can further incorporate either of the seals 860, 960. Notably, while FIGS. 35-36 are drawn relative to FIG. 34, these figures are representative of structural variations that can be incorporated into this entire disclosure, and in particular into the FIG. 27 embodiment.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A fluid reservoir assembly, comprising:
a housing including a reservoir;
a stick including an applicator at an end thereof, the applicator insertable into the reservoir along a path; and
a seal assembly enclosing the reservoir and having two ends spaced apart from one another along the path, the applicator passing through each of the two ends when inserted into the reservoir.

2. The fluid reservoir assembly of claim 1, wherein the applicator is removable from the reservoir along the path, the applicator passing through each of the two ends upon removal from the reservoir.

3. The fluid reservoir assembly of claim 1, wherein the two ends are defined by a respective one of an upper seal and a lower seal.

4. The fluid reservoir assembly of claim 3, wherein an antechamber is defined between the upper and lower seals.

5. The fluid reservoir assembly of claim 3, wherein, upon insertion of the applicator into the reservoir, the applicator contacts the upper seal before the lower seal.

6. The fluid reservoir assembly of claim 3, wherein, upon removal of the applicator from the reservoir, the applicator contacts the lower seal before the upper seal.

7. The fluid reservoir assembly of claim 3, wherein the upper and lower seals are formed separately from one another.

8. The fluid reservoir assembly of claim 3, wherein at least one of the upper and lower seals includes flaps contacting one another at a point along the path to enclose the reservoir.

9. The fluid reservoir assembly of claim 8, wherein the flaps overlap one another at a point along the path.

10. The fluid reservoir assembly of claim 8, wherein the flaps deflect generally away from the path upon removal of the applicator from the reservoir.

11. The fluid reservoir assembly of claim 10, wherein the deflection of the flaps is blocked to control an amount of fluid wiped from the applicator by the flaps.

12. A fluid reservoir assembly, comprising:
a housing including a reservoir, the reservoir storing a cosmetic fluid;
a stick insertable into the reservoir along a path; and
a seal enclosing the reservoir when in a neutral position.

13. The fluid reservoir assembly of claim 12, wherein the stick includes an applicator to carry the cosmetic fluid through the seal and out of the reservoir.

14. The fluid reservoir assembly of claim 12, wherein the seal includes a plurality of flaps, and wherein the flaps contact one another at a point along the path when the seal is in a neutral position.

15. The fluid reservoir assembly of claim 14, wherein the flaps overlap one another at a point along the path when the seal is in a neutral position.

16. The fluid reservoir assembly of claim 15, wherein the flaps include cutouts to accommodate the stick when the stick passes through the seal.

17. A fluid reservoir assembly, comprising:
a housing including a reservoir;
a stick including an applicator, the stick insertable into the reservoir along a path;
an upper seal within the housing; and
a lower seal within the housing and positioned below the upper seal, the reservoir positioned below the lower seal.

18. The fluid reservoir assembly of claim 17, wherein an antechamber is defined between the upper and lower seals.

19. The fluid reservoir assembly of claim 17, wherein the applicator passes through both of the upper and lower seals upon insertion into the reservoir.

20. The fluid reservoir assembly of claim 17, wherein the applicator passes through both of the upper and lowers seals upon being removed from the reservoir.

21. The fluid reservoir assembly of claim 17, wherein at least one of the upper and lower seals includes a plurality of flaps, and wherein the flaps contact one another at a point along the path when the seal is in a neutral position to enclose the reservoir.

22. The fluid reservoir assembly of claim 17, wherein each of the upper and lower seals includes a plurality of flaps, and wherein the flaps contact one another at a point along the path when the seal is in a neutral position to enclose the reservoir.

23. The fluid reservoir assembly of claim 17, wherein the applicator is a brush.

24. The fluid reservoir assembly of claim 17, wherein the upper and lower seals are supported within the housing via respective inwardly projecting flanges.

25. A method comprising the following steps:
(a) providing a fluid reservoir assembly with a seal, the seal enclosing the fluid reservoir assembly, and the seal including at least one flap;
(b) engaging a stick with the seal along a path to form an opening through the seal; and
(c) passing the stick through the opening.

26. The method of claim 25, wherein the opening is formed in step (b) by the stick deflecting the at least one flap generally downwardly and away from the path.

27. The method of claim 25, wherein the opening formed in step (b) is generally circular.

28. The method of claim 25, wherein the at least one flap includes a plurality of flaps that contact one another at a point along the path to enclose the reservoir before step (b).

29. The method of claim 25, wherein the stick includes an applicator at an end thereof.

30. The method of claim 29, further including the step of:
(d) carrying fluid with the applicator from the fluid reservoir through the seal.

* * * * *